US008407716B2

(12) United States Patent
Nixon et al.

(10) Patent No.: US 8,407,716 B2
(45) Date of Patent: Mar. 26, 2013

(54) APPARATUS AND METHODS TO ACCESS INFORMATION ASSOCIATED WITH A PROCESS CONTROL SYSTEM

(75) Inventors: Mark J. Nixon, Round Rock, TX (US); Terry Blevins, Round Rock, TX (US); John Michael Lucas, Leicestershire (GB); Ken Beoughter, Round Rock, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 1190 days.

(21) Appl. No.: 11/756,481

(22) Filed: May 31, 2007

(65) Prior Publication Data

US 2008/0301703 A1    Dec. 4, 2008

(51) Int. Cl.
*G06F 3/00* (2006.01)
*G06F 9/44* (2006.01)
*G06F 9/46* (2006.01)
*G60F 13/00* (2006.01)
*G60F 9/45* (2006.01)
*G60F 9/445* (2006.01)
*G60F 15/16* (2006.01)
*G60F 15/167* (2006.01)
*G60F 15/177* (2006.01)
*G60F 15/173* (2006.01)

(52) U.S. Cl. ........ 719/312; 717/101; 717/220; 717/709; 709/202; 709/250; 709/209; 709/221; 709/224; 709/225; 709/246

(58) Field of Classification Search ........................ None
See application file for complete search history.

(56) References Cited

U.S. PATENT DOCUMENTS

| 4,644,478 | A | | 2/1987 | Stephens et al. |
| 5,146,401 | A | * | 9/1992 | Bansal et al. ................ 700/9 |
| 5,168,441 | A | | 12/1992 | Onarheim et al. |
| 5,611,059 | A | | 3/1997 | Benton et al. |

(Continued)

FOREIGN PATENT DOCUMENTS

| EP | 0813129 | 12/1997 |
| EP | 1122652 | 8/2001 |

(Continued)

OTHER PUBLICATIONS

Core J2EETM Patterns Data Access Object, Aug. 9, 2002, Sun Microsystems.*

(Continued)

*Primary Examiner* — Andy Ho
*Assistant Examiner* — Craig Dorais
(74) *Attorney, Agent, or Firm* — Hanley, Flight & Zimmerman, LLC

(57) ABSTRACT

Example apparatus and methods to access information associated with a process control system are disclosed. A disclosed example method involves receiving a first user-defined parameter name to reference a first datum value in a first data source. The first one of a plurality of data source interfaces is enabled to access the first datum value in the first data source. The example method also involves enabling referencing the first datum value in the first data source based on the first user-defined parameter name. In addition, data source interface software is then generated to access the first datum value in the first data source in response to receiving a first data access request including the first user-defined parameter name.

24 Claims, 15 Drawing Sheets

U.S. PATENT DOCUMENTS

| | | | |
|---|---|---|---|
| 5,631,825 | A | 5/1997 | Van Weele et al. |
| 5,680,409 | A | 10/1997 | Qin et al. |
| 5,706,455 | A | 1/1998 | Benton et al. |
| 5,768,119 | A | 6/1998 | Havekost et al. |
| 5,841,654 | A | 11/1998 | Verissimo et al. |
| 5,926,177 | A | 7/1999 | Hatanaka et al. |
| 6,032,208 | A | 2/2000 | Nixon et al. |
| 6,173,208 | B1 | 1/2001 | Park et al. |
| 6,362,839 | B1 | 3/2002 | Hamilton et al. |
| 6,385,496 | B1 | 5/2002 | Irwin et al. |
| 6,396,516 | B1 | 5/2002 | Beatty |
| 6,445,963 | B1 | 9/2002 | Blevins et al. |
| 6,571,133 | B1 | 5/2003 | Mandl et al. |
| 6,587,108 | B1 | 7/2003 | Guerlain et al. |
| 6,618,630 | B1 | 9/2003 | Jundt et al. |
| 6,633,782 | B1 | 10/2003 | Schleiss et al. |
| 6,691,280 | B1 | 2/2004 | Dove et al. |
| 6,957,110 | B2 | 10/2005 | Wewalaarachchi et al. |
| 6,973,508 | B2 | 12/2005 | Shepard et al. |
| 7,043,311 | B2 | 5/2006 | Nixon et al. |
| 7,110,835 | B2 | 9/2006 | Blevins et al. |
| 2002/0019672 | A1 | 2/2002 | Paunonen |
| 2002/0022894 | A1 | 2/2002 | Eryurek et al. |
| 2002/0022895 | A1 | 2/2002 | Genise et al. |
| 2002/0055790 | A1 | 5/2002 | Havekost |
| 2002/0077711 | A1 | 6/2002 | Nixon et al. |
| 2002/0193888 | A1 | 12/2002 | Wewalaarachchi et al. |
| 2003/0014500 | A1 | 1/2003 | Schleiss et al. |
| 2003/0028269 | A1 | 2/2003 | Spriggs et al. |
| 2003/0153988 | A1 | 8/2003 | Shepard et al. |
| 2003/0191803 | A1 | 10/2003 | Chinnici et al. |
| 2003/0236576 | A1 | 12/2003 | Resnick et al. |
| 2004/0075689 | A1 | 4/2004 | Schleiss et al. |
| 2004/0199925 | A1 | 10/2004 | Nixon et al. |
| 2005/0197803 | A1 | 9/2005 | Eryurek et al. |
| 2005/0197805 | A1 | 9/2005 | Eryurek et al. |
| 2005/0197806 | A1 | 9/2005 | Eryurek et al. |
| 2005/0213722 | A1 | 9/2005 | Stormon et al. |
| 2006/0218311 | A1 | 9/2006 | Maranat et al. |

FOREIGN PATENT DOCUMENTS

| | | |
|---|---|---|
| GB | 2349958 | 11/2000 |
| GB | 2372365 | 8/2002 |
| JP | 2004-086504 | 3/2004 |
| JP | 2005-086334 | 3/2005 |
| WO | 9504314 | 2/1995 |
| WO | 02071169 | 9/2002 |
| WO | 03075206 | 9/2003 |
| WO | 2005107409 | 11/2005 |
| WO | 2005107410 | 11/2005 |
| WO | 2005107416 | 11/2005 |
| WO | 2005109122 | 11/2005 |
| WO | 2005109123 | 11/2005 |
| WO | 2005109124 | 11/2005 |
| WO | 2005109125 | 11/2005 |
| WO | 2005109126 | 11/2005 |
| WO | 2005109127 | 11/2005 |
| WO | 2005109128 | 11/2005 |
| WO | 2005109129 | 11/2005 |
| WO | 2005109130 | 11/2005 |
| WO | 2005109131 | 11/2005 |
| WO | 2005109250 | 11/2005 |

OTHER PUBLICATIONS

OLE and Data Transfer Functions, Aug. 30, 2006.*
Cache, Feb. 1, 2001, Webopedia, 4 pages.*
Fisher-Rosemount Systems, Inc., DeltaV Bulk Edit, pp. 1-12, Apr. 2002.
Kopp, John, About.com, C++ Tutorial—Lesson 29: Inheritance, Continued, http://www.cplus.about.com/od/beginnerctutorial/I/aa12050c.htm, downloaded Apr. 27, 2005.
Kopp, John, About.com, C++ Tutorial—Lesson 29: Inheritance, http://cplus.about.com/od/beginnerctutorial/I/aa120502b.htm, downloaded Apr. 27, 2005.
Kopp, John, About.com, C++ Tutorial—Lesson 29: Inheritance Introduction, http://cplus.about.com/od/beginnerctutorial/I/aa120502a.htm, downloaded Apr. 27, 2005.
Kopp, John, About.com, C++ Tutorial—Lesson 17: Classes, Members and Methods, Defining Methods, http://cplus.about.com/od/beginnerctutorial/I/aa070602c.htm, downloaded Apr. 27, 2005.
Kopp, John, About.com, C++ Tutorial—Lesson 17: Classes, Members and Methods, Defining Classes, http://cplus.about.com/od/beginnerctutorial/I/aa070602b.htm, downloaded Apr. 27, 2005.
Kopp, John, About.com, C++ Tutorial—Lesson 17: Classes, Members and Methods, http://cplus.about.com/od/beginnerctutorial/I/aa070602a.htm, downloaded Apr. 27, 2005.
Kopp, John, About.com, C++ Tutorial—Lesson 9: Introduction to Classes, Object Terminology, http://cplus.about.com/od/beginnerctutorial/I/aa041002e.htm, downloaded Apr. 27, 2005.
Kopp, John, About.com, C++ Tutorial—Lesson 9: Introduction to Classes, Using Objects, http://cplus.about.com/od/beginnerctutorial/I/aa041002d.htm, downloaded Apr. 27, 2005.
Kopp, John, About.com, C++ Tutorial—Lesson 9: Introduction to Classes, Defining Classes, htpp://cplus.about.com/od/beginnerctutorial/I/aa041002b.htm, downloaded Apr. 27, 2005.
Patent Cooperation Treaty, International Search Report and Written Opinion of the International Searching Authority for PCT/US2005/015596, Apr. 5, 2006, 12 pages.
Sangyong Han et al., Web Based rSPC (realtime Statistical Process Control) System Supporting XML Protocol, Industrial Electronics, Jun. 2001, pp. 399-403, Piscataway, New Jersey.
Patent Cooperation Treaty, International Search Report and Written Opinion of the International Searching Authority for PCT/US2005/015439, Aug. 10, 2005, 12 pages.
Patent Cooperation Treaty, International Search Report and Written Opinion of the International Searching Authority for PCT/US2005/015394, Mar. 20, 2006, 15 pages.
D. Chen, Real-Time Management in the Distributed Environment, Ph.D. Thesis, 1999.
Patent Cooperation Treaty, International Search Report and Written Opinion of the International Searching Authority for PCT/US2005/015585, May 9, 2006, 14 pages.
Developers.Sun.Com, Core J2EE Patterns—Data Access Object, http://web.archive.org/web/20040414043406/javasun.com/blueprints/corej2eepatterns/Patterns/DataAccessObject.html, Apr. 14, 2006, 10 pages.
Mohr S et al, BizTalk and Application Integration—Translating Between Message Specification: BizTalk Mapper, Professional BizTalk, Apr. 14, 2001, 3 pages.
W3C, XSL Transformations (XSLT), Version 1.0, W3C Recommendation, Nov. 16, 1999, 11 pages.
Nixon, Mark et al., U.S. Appl. No. 10/575,173, filed Apr. 7, 2006 for "Graphic Display Configuration Framework for United Process Control System Interface."
UK Intellectual Property Office, Patents Act 1977 Examination Report under Section 18(3), Oct. 26, 2007, 4 pages, United Kingdom.
Camo Software, Inc, The Unscrambler 9.6 product datasheet, www.camo.com, 2 pages.
Statsoft, Statistica: Multivariate Statistical Process Control product datasheet, www.statsoft.com, 2 pages.
Umetrics Inc., Product Specification for SIMCA-P 11, www.umetrics.com, 2 pages.
Mehta, Ashish, Ganesamoorthi, Sai, and Wojsznis, Willy, Feedforward Neural Networks for Process Identification and Prediction, Neural Network and Expert Systems Presentation, 2001, 9 pages.
Tzovla, Vasiliki and Zhang, Yan, Abnormal Condition Management using Expert Systems, Neural Network and Expert Systems Presentation, 2001, 9 pages.
Han et al., "Web Based RSPC (Realtime Statistical Process Control) System Supporting XML Protocol" ISIE, vol. 1 2001, pp. 399-403.
The European Patent Office, "Extended European Search Report," European application No. EP 08157189.5, Jul. 6, 2010, 7 pages.
UK Examination Report for corresponding Application No. GB0809880.8 issued on Jun. 16, 2011 (3 pages).
Phillippines Intellectual Property Office, Office Action, issued for Philippine application serial No. 12008000185, mailed on Jan. 27, 2012, 2 pages.

State Intellectual Property Office, Office Action, issued for Chinese Patent Application Serial No. 200810098400.5, on Dec. 7, 2011, 13 pages.

Office action issued by the Japanese Patent Office on Jul. 24, 2012, in connection with JP Application No. 2008-144424 (3 pages).

State Intellectual Property Office of P.R. China, Office Action, for China patent application serial No. 200810098400.5, issued on Sep. 12, 2012, 7 pages.

* cited by examiner

CONFIGURATION PROGRAM: *LAB ACCESS MODULE*

| PARAMETER NAME | DATA TYPE | READ ONLY | ALARM | ALARM VALUE | PATH | UPDATE TIME | MATH STAT/FN |
|---|---|---|---|---|---|---|---|
| *PRESSURE* | *FLOAT* | *YES* | *NONE* | | *PT1.IN* | | |
| | | | | | | | |
| | | | | | | | |

ADD

FIG. 7

ON-LINE MODE: *LAB ACCESS MODULE*

| PARAMETER NAME | DATA TYPE | ALARM | ALARM VALUE | PATH | UPDATE TIMES | MATH STAT/FN | ACTUAL VALUE | DATA QUALITY |
|---|---|---|---|---|---|---|---|---|
| *PRESSURE* | *FLOAT* | *NONE* | | *PT1.IN* | | | | |
| | | | | | | | | |
| | | | | | | | | |

FIG. 8

APPARATUS AND METHODS TO ACCESS INFORMATION ASSOCIATED WITH A PROCESS CONTROL SYSTEM

FIELD OF THE DISCLOSURE

The present disclosure relates generally to process control systems and, more particularly, to apparatus and methods to access information associated with a process control system.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controllers receive signals indicative of process measurements made by the field devices and/or other information pertaining to the field devices, use this information to implement a control routine, and then generate control signals that are sent over the buses or other communication lines to the field devices to control the operation of the process. In this manner, the process controllers may execute and coordinate control strategies using the field devices via the busses and/or other communication links communicatively coupling the field devices.

Information from the field devices and the controllers may be made available to one or more applications (i.e., software routines, programs, etc.) executed by the operator workstation (e.g., a processor-based system) to enable an operator to perform desired functions with respect to the process, such as viewing the current state of the process, evaluating the process, modifying the operation of the process, etc. Many process control systems also include one or more application stations. Typically, these application stations are implemented using a personal computer, a workstation, a server, or the like that is communicatively coupled to the controllers, operator workstations, and other systems within the process control system via a local area network (LAN). Each application station may execute one or more software applications that perform campaign management functions, maintenance management functions, virtual control functions, diagnostic functions, real-time monitoring functions, safety-related functions, configuration functions, etc. within the process control system.

Software processes executed by operator workstations, application stations, controllers, and other processor systems communicatively coupled to a network often require accessing information or data in other data sources such as, for example, network entities provided by third parties (e.g., field devices, servers, databases, programmable logic controllers, analyzers, lab systems, business systems, enterprise historians, back-end databases using SQL servers or the like, etc.). However, network entities often do not use the same communication interface standard, protocol, or data access functions. Thus, any time an engineer or user develops a software process (e.g., a process control routine) requiring data access to multiple, different data sources, the engineer must develop a customized data source access interface for each data source to which the engineer would like to enable data access. Thus, the engineer must be highly trained or highly knowledgeable in the communication interface standards and protocols associated with the various data sources to create each customized data source access interface.

SUMMARY

Example apparatus and methods to access information associated with networked entities that interface to a process control system are described. In accordance with an example, an example apparatus includes a processor system and a memory communicatively coupled to the processor system. The memory includes stored instructions that enable the processor system to receive a first user-defined parameter name to reference a first datum value in a first data source and to enable a first one of a plurality of data source interfaces to access the first datum in the first data source. The stored instructions also enable referencing the first datum value in the first data source based on the first user-defined parameter name. In addition, the stored instructions enable the processor system to generate data source interface software configured to access the first datum value in the first data source in response to receiving a first data access request including the first user-defined parameter name.

In accordance with another example, an example method involves receiving a first user-defined parameter name to reference a first datum value in a first data source. The first one of a plurality of data source interfaces is enabled to access the first datum value in the first data source. The example method also involves enabling referencing the first datum value in the first data source based on the first user-defined parameter name. In addition, data source interface software is then generated to access the first datum value in the first data source in response to receiving a first data access request including the first user-defined parameter name.

BRIEF DESCRIPTION OF THE DRAWINGS

FIG. 7 is an example configuration program graphical user interface (GUI) that may be used during a configuration phase to configure a universal interface module.

FIG. 8 is an example runtime GUI that may be used to display data accessed using a universal interface module during an execution phase.

DETAILED DESCRIPTION

Figure 1:
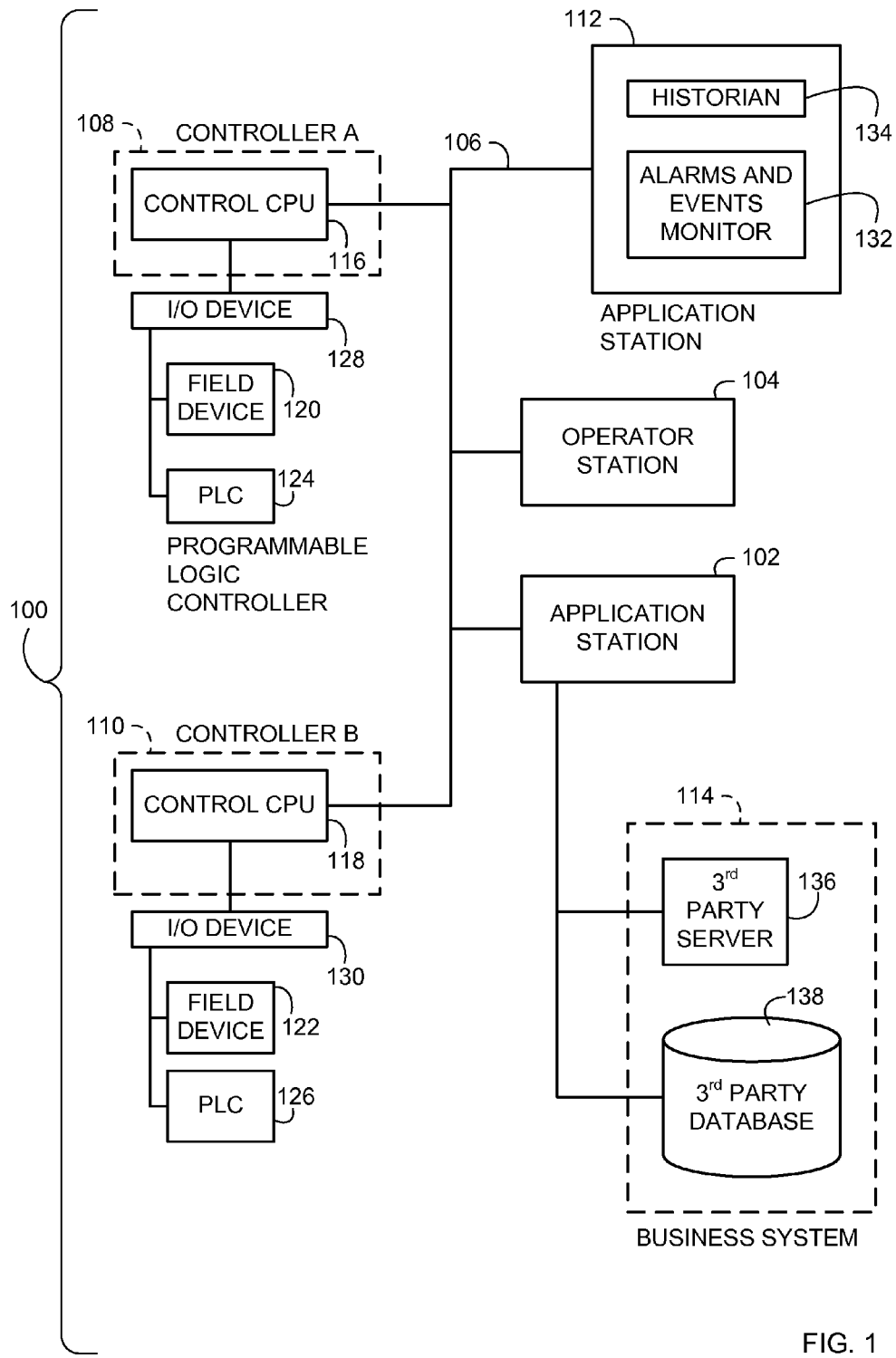
FIG. 1 is a block diagram illustrating an example process control system.

Although the following describes example apparatus and systems including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example apparatus and systems, persons of ordinary skill in the art will readily appreciate that the examples provided are not the only way to implement such apparatus and systems.

Known techniques used to enable a software process to access (e.g., read or write) information associated with (e.g., originating in or stored in) various types of data sources (e.g., databases, servers, process control system controllers, etc.) located throughout a network system (e.g., a company enterprise having a plurality of sub-systems and data sources located therein) employ data source interface constructs or data source interface modules (e.g., software functions, object-oriented programming classes, software layers, etc.) highly customized to exchange information with respective data sources. When interfacing to standard components supplied by the same control system manufacturer, these interfaces are typically pre-built and much of the interfacing software complexity is hidden from the user. However, each time a software process is configured to access information in a different target data source from a third party, an individual (e.g., a programmer, an engineer, etc.) relatively highly trained or highly knowledgeable in the communication interface standards and protocols associated with the target data source must create a highly customized data source interface configured to access information in the target data source. Therefore, the known techniques require individuals to have a relatively high-degree of knowledge of the communication interfaces, communication protocols, etc. of each data source with which the software processes are to exchange information.

Unlike known techniques for interfacing to third party data sources, the example apparatus and methods described herein enable using a universal data source access interface (i.e., a universal interface) to access information or data associated with (e.g., originating in or stored in) various types of data sources without requiring a user to have a substantial amount of knowledge of the communication interfaces, communication protocols, etc. of the different types of data sources. A control system may have various instances of the universal interface, each of which is configured to access one or more third party data sources. Each instance of the universal interface includes a general data access interface through which data access requests can be made to access data in a data source corresponding to that universal interface instance. The general data access interface may be accessed through the control system using data access techniques similar to those used to access other data in the control system. In the illustrated example, control system software to configure and execute control system routines is implemented using modules. A module can be configured by a user to define a process control routine to be executed by a controller and/or a field device of the process control system. The module includes a plurality of function blocks that define functions to implement the process control routine. In some example implementations, the functions may cause a controller or a field device to acquire measurement values (e.g., pressure values, temperature values, flow values, voltage values, current values, etc.), perform algorithms or calculations (e.g., integrations, derivatives, additions, subtractions, etc.), control instrumentation (e.g., opening/closing valves, furnace adjustments, boiler adjustments, etc.), or to perform any other functions. In the illustrated examples described below, the universal interface is implemented using a module having a plurality of user-configurable settings to specify the type of data to be accessed (e.g., read, written, modified, etc.).

The universal interface module can be configured to assign user-defined names to particular data to enable applications throughout a control system to access the data based on the user-defined names instead of requiring a data access request to provide path information, device identification information, register information indicative of the location of desired data each time the data is to be accessed. The example universal interface module includes a plurality of data source interface functions that are relatively highly customized to communicate with the different types of data sources (e.g., programmable logic controllers (PLC's), field devices, servers, etc.). The example universal interface module abstracts the general data access request interface from the highly customized data source interface functions associated with data sources so that a user or an application can use the example universal interface module to access information in different types of data sources without requiring substantial familiarity with or knowledge about the various communication interface standards and protocols associated with the different data sources.

In an example implementation, an example universal interface module may be implemented in an application station coupled to a lab data system to access lab measurement data generated and/or stored in the lab data system. The universal interface module in the application station may include a general data access interface that a user or a software process (e.g., an application) can use to access the lab measurement data using user-defined names assigned to respective lab data. The universal interface module may also include a lab data access request generator that receives a data request from the general data access interface containing a user-defined name assigned to the requested lab data. The lab data access request generator is configured to format the data request using an interface format that is specific to accessing the lab data in the lab data system that generates and/or stores the lab data. In this manner, a user or a software process configured to use the example universal interface module can request lab data using a user-defined data name via the general data access request interface of the example universal interface module. In turn, the example universal interface module can use the lab data access request generator to generate a data access request and communicate the request to the lab data system so that the user or the software process need not be required to know the specific data request format for communicating directly with the lab data system.

In another example implementation, an example universal interface module instantiated in an application station within a control system may be provided with a structured query language (SQL) database interface to provide data access to an SQL database inside or outside the control system. The SQL database interface may include a query string generator function that formats a data request into an SQL query string to communicate to an SQL database for retrieving and/or storing data. In this manner, a user or a software process configured to use the example universal interface module can provide a data access request via the general data access request interface of the example universal interface module. The data access request can originate within the application station executing the universal interface module or from another application station or other component communicatively coupled to the application station. In turn, the example universal interface module can convert the data access request to an appropriate SQL query string using the SQL query string generator function and communicate the SQL query string to the SQL database.

Now turning to FIG. 1, an example enterprise network 100 includes one or more process control systems, data analysis systems, data storage systems, etc. associated with automating one or more processes in, for example, a manufacturing environment, a material handling environment, etc. The example enterprise network 100 includes an application station 102 and an operator station 104 communicatively coupled via a bus or a local area network (LAN) 106 to a controller A 108, a controller B 110, an application station 112, and a business system 114 that is connected into the enterprise network 100 through the application station 102. Although a particular quantity of systems and particular types of systems are shown in FIG. 1 for purposes of discussion, the example enterprise network 100 may include more or fewer systems and other types of systems.

The application station 102 may be configured to perform operations associated with one or more information technology applications, user-interactive applications, and/or communication applications. For example, the application station 102 may be configured to perform operations associated with process control-related applications and communication applications that enable the application station 102, the operator station 104, the controller A 108, the controller B 110, the application station 112, and the business system 114 to communicate with one another and/or other systems using any desired communication media (e.g., wireless, hardwired, etc.) and protocols (e.g., HTTP, SOAP, etc.).

The LAN 106 may be implemented using any desired communication medium and protocol. For example, the LAN 106 may be based on a hardwired or wireless Ethernet communication scheme, which is well known and, thus, is not described in greater detail herein. However, as will be readily appreciated by those having ordinary skill in the art, any other suitable communication medium and protocol could be used. Further, although a single LAN is shown, more than one LAN and appropriate communication hardware within the application station 102 and the operator station 104 may be used to provide redundant communication paths between these systems. Although the stations 102, 104, and 112 and/or the controllers 108 and 110 of the example enterprise network 100 are shown as being communicatively coupled via the LAN 106, one or more of the stations 102, 104, and 112, the controllers 108 and 110, and/or the third party business system 114 in the example enterprise network 100 may be geographically remotely located, in which case those one or more stations and controllers may be communicatively coupled to the LAN 106 via a wide area network (WAN) (not shown) that is implemented using, for example, a wireless communication link, an Internet-based or other switched or packet-based communication network, telephone lines (e.g., digital subscriber lines), or any combination thereof. Further, although a single LAN is shown, more than one LAN and appropriate communication hardware within the stations 102, 104, and 112, the controllers 108 and 110, and/or the business system 114 may be used to provide redundant communication paths therebetween.

The application station 102 may also be configured to perform operations associated with one or more application(s) used to implement the example methods and systems described herein to enable software processes to access (e.g., read and/or write) information in one or more of the application station 102, the operator station 104, the controller A 108, the controller B 110, the application station 112, and/or the business system 114. The application station 102 and the operator stations 104 may be implemented using one or more workstations or any other suitable computer systems or processing systems (e.g., the processor system 1410 of FIG. 14). For example, the application station 102 and the operator stations 104 could be implemented using single processor personal computers, single or multi-processor workstations, etc.

Turning in detail to the controllers 108 and 110, the controller A 108 includes a control CPU 116 and the controller B 110 includes a control CPU 118, each of which is communicatively coupled to the LAN 106. Each of the control CPU's 116 and 118 is communicatively coupled to a respective field device 120 and 122 and a respective programmable logic controller (PLC) 124 and 126 via a respective I/O device 128 and 130. The field devices 120 and 122 and the PLC's 124 and 126 may be supplied by the control system manufacturer or by a third party. The control CPU 116, the field device 120, the PLC 124, and the I/O device 128 coupled to the controller A 108 may be substantially similar to or different from respective ones of the control CPU 118, the field device 122, the PLC 126, and the I/O device 130 coupled to the controller B 110.

One or both of the controllers 108 and 110 may be implemented using, for example, DeltaV™ controllers sold by Fisher-Rosemount Systems, Inc. and Emerson Process Management™. However, any other controllers could be used instead. While only one control CPU is shown in each of the controllers 108 and 110 of FIG. 1, additional control CPU's of any desired type or combination of types could be provided. In any case, the control CPU's 116 and 118 may execute one or more process control modules having one or more process control routines that have been generated by a system engineer or other system operator using the application station 102 and instantiated in the control CPU's 116 and 118. In addition, the control CPU's 116 and 118 may execute one or more universal interface modules to enable users and/or applications to access data in the field devices 120 and 122 and the PLC's 124 and 126 using user-defined data access request parameter names instead of having to provide device ID's, register addresses or ID's, etc. that define the location of the data in network entities including third party devices. The universal interface modules described herein may be configured to periodically access and locally cache values accessed from network entities including third party devices to make this information readily available to other applications in the control system.

One or both of the field devices 120 and 122 may be Fieldbus compliant valves, actuators, sensors, etc., in which case the field devices 120 and 122 communicate with their respective control CPU 116 and 118 using the well-known Fieldbus protocol. Of course, fewer or more field devices and other types of field devices and communication protocols could be used instead. For example, one or both of the field devices 120 and 122 could instead be Profibus or HART compliant devices that communicate with their respective control CPU 116 and 118 using the well-known Profibus and HART communication protocols. Additional I/O devices (similar or identical to the I/O devices 128 and 130) may be coupled to the control CPU 116 and 118 to enable additional groups of field devices, which may be Fieldbus devices, HART devices, etc., to communicate with the control CPU 116 and 118.

As depicted in FIG. 1, the application station 112 executes an alarms and events monitor 132 and an event historian 134. The alarms and events monitor 132 may be configured to perform operations associated with one or more monitoring routines to monitor various aspects and/or areas associated with one or more of the process controllers 108 and 110 of the example enterprise network 100. For example, users may specify particular events (e.g., pressure limits, process start times, process end times, equipment failure, etc.) in the controllers 108 and 110 to be monitored by the alarms and events monitor 132 and may further specify types of alarms to be generated when the events have particular characteristics (e.g., threshold limits reached). The event historian station 134 may acquire or collect process control log information associated with each event, alarm, action, etc. that the alarms and events monitor 132 is configured to monitor. The event historian station 134 may store the process control log information in a log database (not shown).

The business system 114 is provided with a plurality of servers and databases of which a third party server 136 and a third party database 138 are shown by way of example. In general, the business system 114 may be directed to business aspects of the enterprise network 100 such as, for example, accounting, purchasing, sales, marketing, etc. For example, the business system 114 may store information indicating quantities of raw material inventoried, operating costs, required production quantities, etc. Some of the information in the business system 114 may be generated based on information obtained from other components (e.g., the controllers 108 and 110, the application station 112, etc.) of the enterprise network 100. In addition, the controllers 108 and 110 and/or the application station 112 may retrieve information stored in the business system 114 through a universal interface module (e.g., the universal interface module 206 of FIG. 2) executed by the application station 102 and configured to enable access to data in the business system 114. Also, production performance information may be communicated to the business system from the control system made up of the stations 102, 104, and 112 and the controllers 108 and 110.

The third party server 136 and the third party database 138 may be implemented to perform any business-related operations. The 'third party' naming convention is used to indicate that the third party server 136 and the third party database 138 do not use the same data access interface standard or protocol associated with the stations 102, 104, and 112 and the controllers 108 and 110. That is, a data access protocol used to access information in the third party server 136 and the third party database 138 may be substantially different from the data access protocols used to access information within the control system made up of the stations 102, 104, and 112 and the controllers 108 and 110. For example, if the stations 102, 104, and 112 and the controllers 108 and 110 are provided by a common supplier (e.g., Emerson Process Management™) as part of a control system software suite (e.g., the DeltaV Digital Automation System by Emerson Process Management™), each of the stations 102, 104, and 112 and the controllers 108 and 110 may be configured to use a supplier-defined data access standard (i.e., a native data access interface standard). However, the stations 102, 104, and 112 and the controllers 108 and 110 may not be configured to use a non-native, third party data access interface standard associated with the third party server 136 and the third party database 138 or third party field devices such as a field device or a PLC. In the illustrated example, the third party data access interface is different from the native data access interface. That is, third party data sources requiring the third party data access interface are not provided with data access interfaces designed or configured in accordance with the same supplier-defined data access standards used to implement the native data access interface.

In some example implementations, the third party data access interface to access data in third party data sources is configured in accordance with a supplier-defined data access standard or an industry-defined data access standard different from a supplier-defined data access standard. The apparatus and methods described herein provide a universal interface module that translates data access requests having a first format to a native data access interface format and/or a third party data access interface format to enable users, software processes, and/or software applications to access native data sources and third party data sources without requiring the users, the software processes, and/or the software applications to provide data access requests in formats specific to each type of data source. In this manner, the data access request format for accessing data in any type of data source is standardized to a universal format in which a user can define parameter names for data to be accessed, and the user, software processes, and/or applications can use the user-defined parameter names to access data.

The example methods and apparatus described herein can be used to implement universal interface modules that can be executed by native components of a control system such as, for example, the stations 102, 104, and 112 and the controllers 108 and 110 to access data generated thereby and/or stored therein. The universal interface modules can also be used by native components of a control system to access data generated by and/or stored in the business system 114, field devices (e.g., field devices similar or identical to the field devices 120 and 122), and/or PLC subsystems (e.g., PLC's similar or identical to the PLC's 124 and 128) provided by third-party manufacturers. In particular, the universal interface modules enable accessing data in any component coupled to a control system without requiring users or software processes of the native components to have a relatively high-degree of knowledge of the various communication protocols, communication interfaces, or data access functions associated with different data sources throughout the enterprise network 100.

The example enterprise network 100 is provided to illustrate one type of system within which the example systems and methods described in greater detail below may be advantageously employed. However, the example systems and methods described herein may, if desired, be advantageously employed in other systems of greater or less complexity than the example enterprise network 100 shown in FIG. 1 and/or systems that are used in connection with process control activities, enterprise management activities, communication activities, etc.

Figure 2:
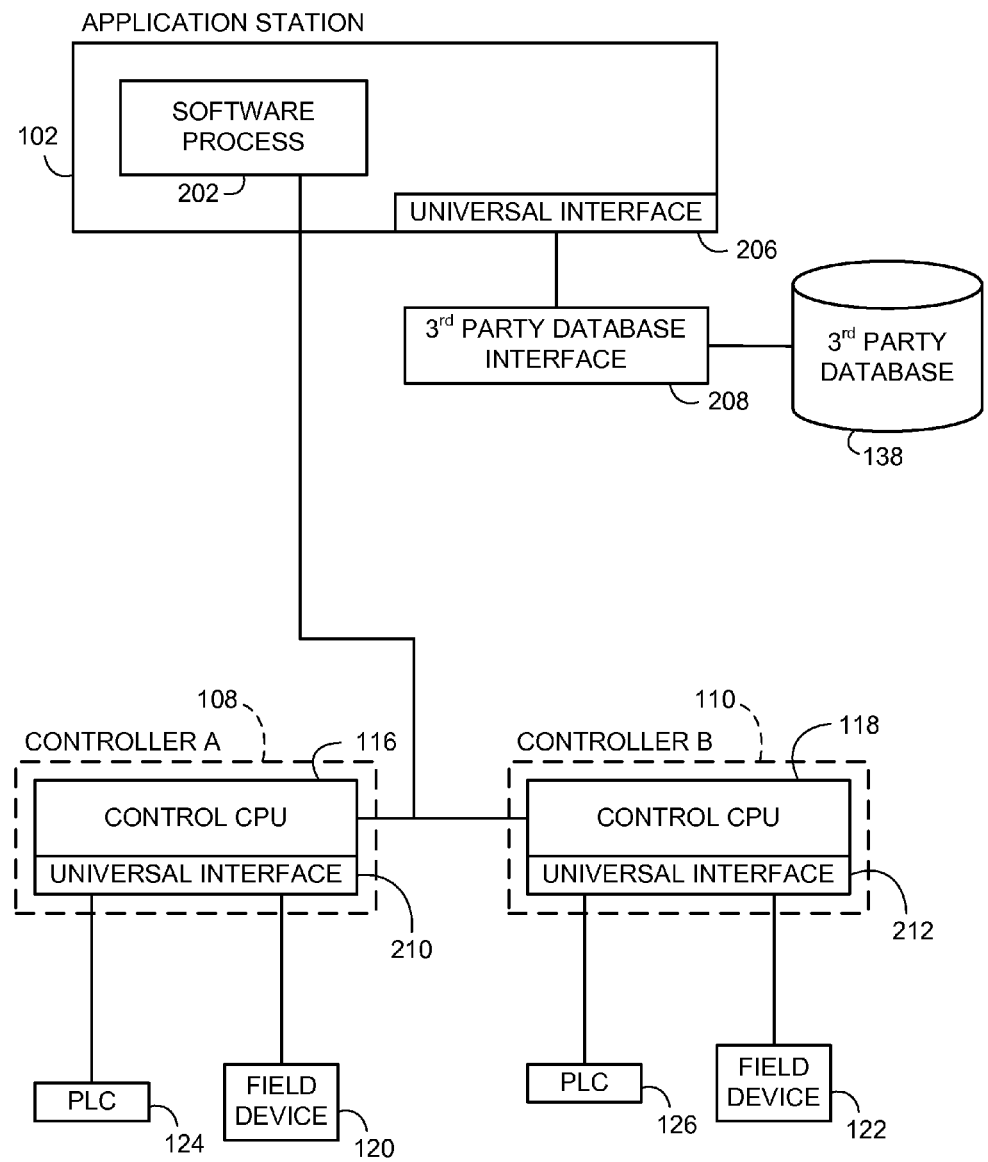
FIG. 2 is a data access configuration having an example universal interface module implemented in accordance with the example methods and apparatus described herein to enable accessing a plurality of data sources.

A data access configuration 200 depicted in FIG. 2 is configured in accordance with the example methods and apparatus described herein and is configured to enable a software process 202 executed by the application station 102 to access information in a plurality of different data sources via example universal interface modules. In the illustrated example, an example universal interface module 206 executed by the application station 102 provides access to the third party database 138 via a third party database interface 208. An example universal interface module 210 executed by the control CPU 116 provides access to data generated by and/or stored in the controller A 108, the field device 120, and/or the PLC 124. An example universal interface module 212 executed by the control CPU 118 provides access to data generated by and/or stored in the controller B 110, the field device 122, and/or the PLC 126. Each of the universal interface modules 206, 210, and 212 is instantiated and executed by its respective network entity based on user-defined configurations that specify data to be accessed and user-defined parameter names for that data. The instances of the universal interface modules 206, 210, and 212 are implemented as modules that may be relatively easily configured once during a configuration phase to define paths to data that is to be accessed and that can be used to subsequently access that data a plurality of times using a user-defined parameter name.

The software process 202 may be a user application executable on the stations 102 and 104 (FIG. 1) and have a graphical user interface (GUI), a software process executable by a control CPU substantially similar or identical to one of the control CPU's 116 and 118, or a software process executable by any other system. In some example implementations, the software process 202 may be a background process that monitors particular data generated in the enterprise network 100. In other example implementations, the software process 202 may be a web-based application via which users can access information associated with the enterprise network 100. Using the universal interface module 206, the software process 202 need not be provided with data access functions that are specific to the third party database interface 208 to access the third party database 138. In a similar manner, the software process 202 can use the universal interface module 210 to access data in the control CPU 116, the field device 120, and/or the PLC 124 and can use the universal interface module 212 to access data in the control CPU 118, the field device 122, and/or the PLC 126. In the illustrated example, and as described in greater detail below, the universal interface modules 206, 210, and 212 are implemented as modules having a plurality of pre-defined functions configured to receive data access requests in a first format containing user-defined parameter names and to convert the data access requests to formats corresponding to data sources to be accessed and communicate the formatted data access requests to corresponding data sources (e.g., the third party database 138, the control CPU's 116 and 118, the PLC's 120 and 122, and the field devices 124 and 126). In addition, when the software process 202 provides data to be written into a data source, the universal interface modules 206, 210, and 212 are configured to translate the provided data into formats corresponding to respective data sources. In this manner, a user is not burdened with knowing the details of the different communication protocols, communication formats, communication interfaces, etc. associated with the different data sources with which it exchanges information.

Figure 3:
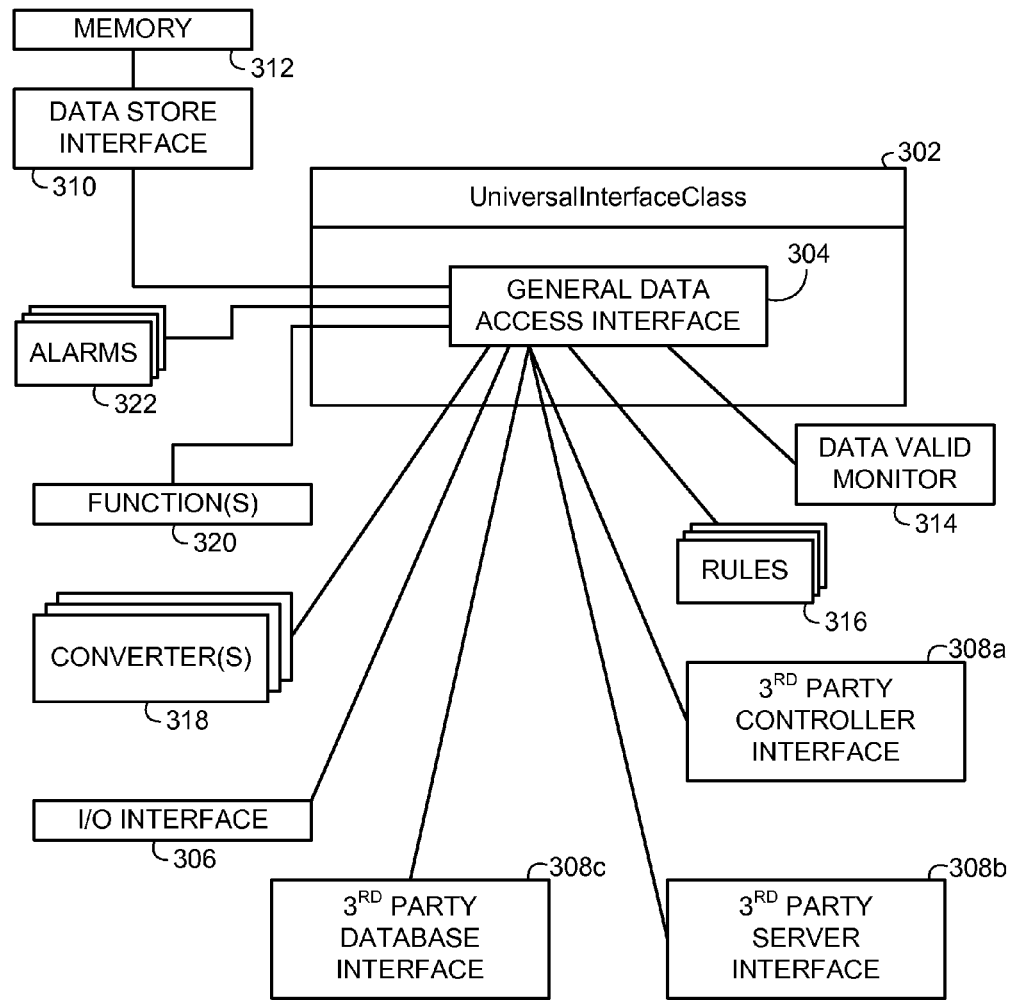
FIG. 3 is a block diagram of an example implementation of the universal interface module of FIG. 2.

FIG. 3 is a block diagram of an example programming structure that may be used to implement each of the universal interface modules 206, 210, and 212 of FIG. 2. In the illustrated example, each of the universal interface modules 206, 210, and 212 is implemented using an object-oriented programming environment. However, other types of programming environments may be used instead in connection with any suitable type of programming language. Universal interface modules may be instantiated in different network entities. For example, the application station 102 of FIGS. 1 and 2 is configured to instantiate and execute the universal interface module 206, the control CPU 116 of FIGS. 1 and 2 is configured to instantiate and execute the universal interface module 210, and the control CPU 118 of FIGS. 1 and 2 is configured to instantiate and execute the universal interface module 212. Some or all of the features of a universal interface module may be implemented using instructions, code, and/or other software and/or firmware, etc. stored on a machine accessible medium that, when executed by, for example, a processor system (e.g., the example processor system 1410 of FIG. 14), perform the operations represented in the flowcharts of FIGS. 13A-13B.

In the illustrated example, each of the universal interface modules 206, 210, and 212 of FIG. 2 may be designed, programmed, etc. to be executed by a respective native component of the enterprise 100 (FIG. 1) to access data in that component (e.g., the controller A 108 of FIG. 1) or in another data source (e.g., the field device 120 or the PLC 124 of FIGS. 1 and 2) coupled to that component. Data access request formats to access different network entities including native and third party controllers, servers, databases, etc. may be defined by a software provider, a process control system vendor, equipment manufacturer, etc.

An instantiation of a universal interface module may be configured to operate based on one or more user-selectable features that may be configured via a configuration interface described below in connection with FIG. 7. During a configuration phase, a user (e.g., a customer of a software provider, a process control system vendor, equipment manufacturer, etc.) can select some or all of the features based on the types of data sources to which the user would like to enable data access and the types of functions (e.g., data processing, alarms, etc.) that the user would like to enable for use in connection with the data access. During an execution phase, a universal interface module operates based on the user configuration specified during the configuration phase. A design phase, a configuration phase, and an execution phase of a universal interface module are described in detail below in connection with FIG. 4.

As shown in FIG. 3, each of the universal interface modules 206, 210, and 212 of FIG. 2 is implemented using an object-oriented class of type UniversalInterfaceClass and referred to herein as the universal interface class 302. The universal interface class 302 may be used to instantiate an object of type UniversalInterfaceClass that inherits characteristics of other classes (e.g., data source interface classes, alarm classes, data processing classes, etc.) that may be implemented in accordance with the functions described below in connection with FIG. 3. In this manner, the object type of UniversalInterfaceClass can be used as a container or module having various capabilities to enable any native component of the enterprise 100 to access one or more data sources (e.g., the field devices 120 and 122, the PLC's 124 and 126, and the third party database 138 of FIGS. 1 and 2).

The universal interface class 302 is provided with a general data access interface 304 via which the data in data sources can be accessed in a manner substantially similar or identical to the way in which data is accessed in other modules (e.g., process control routine modules) of the enterprise network 100. The general data access interface 304 may define a plurality of universal data access functions that native components of the enterprise network 100 can use to request access to information stored in one or more native data sources (e.g., the field devices 120 and 122 and the PLC's 124 and 126 of FIGS. 1 and 2). The universal data access functions of the general data access interface 304 may be used in the same way by native components of the enterprise 100 to access information in data sources located in third party systems and devices (e.g., the business system 114 of FIG. 1).

To enable a universal interface module to access information in native data sources specified during a configuration phase, the universal interface class 302 is provided with an I/O interface 306. To enable a universal interface module to access information in third party data sources specified during a configuration phase, the universal interface class 302 is provided with a plurality of third party data source interfaces 308*a-c*.

In the illustrated example, the third party data source interfaces 308*a-c* include a third party controller interface 308*a*, a third party server interface 308*b*, and a third party database interface 308*c*. In other example implementations, other third party data access interfaces may be provided to access information in other types of third party data sources. As discussed above, third party data sources (e.g., the third party server 136 and the third party database 138 of FIG. 1) are data sources that are accessed using third party data access functions implemented in accordance with a data access standard (e.g., a supplier-defined standard or an industry-defined standard) different than a data access standard (e.g., another supplier-defined standard or another industry-defined standard) used to implement native data access functions. Thus, the third party data source interfaces 308*a-c* include third party data access functions to access information in third party data sources.

To store data in a memory 312, the universal interface class 302 may be provided with a data store interface 310 (i.e., a data structure interface 310). In the illustrated example, an instantiation of the universal interface class 302 uses the memory 312 to store copies of the information accessed (e.g., written or read) by the universal interface module instantiation. For example, if the universal interface module 206 of FIG. 2 is configured to periodically transmit requests to read data from the third party database 138 of FIGS. 1 and 2, the universal interface module 206 reads the data from the specified data source via the third party database interface 308*c*, and uses the data store interface 310 to store a copy of the read data (e.g., to cache the read data) in the memory 312. In this manner, if a native component of the enterprise network 100 such as, for example, the application station 102 of FIGS. 1 and 2, communicates a read data request to the universal interface module 206, the universal interface module 206 may determine whether it has the requested data cached in local memory and, if so, the universal interface module 206 can return the cached values immediately to the application station 102 via the general data access interface 304 instead of requiring a relatively longer delay to access the third party database 138. Similarly, when the application station 102 communicates a write request to change a value in the third party database 138, the universal interface module 206 changes the value in the memory 312 and writes data that has been changed in the memory 312 to the third party database 138 via the third party database interface 308*c*.

In an example implementation, the universal interface module 206 uses the data store interface 310 to request the memory 312 to be allocated in a local memory (e.g., a hard drive, a random access memory (RAM)) of the application station 102. Storing data locally in the memory 312 can be advantageously used to increase data access speeds by allowing the same information to be accessed a plurality of times and by a plurality of network components in the enterprise network 100 without having to access the data source (e.g., one of the field devices 120 and 122 or one of the PLC's 124 and 126). Also, the local storage capability provided by the memory 312 allows an application to communicate a write data request along with data to be written to a universal interface module regardless of the communication status (e.g., regardless of whether a communication link is temporarily disabled) between the universal interface module and the third party device. For example, the universal interface module can use the memory 312 to locally store the write data and subsequently write the data to the third party device when the communication link between the universal interface module and the third party device is re-established.

In some example implementations where data is to be written to a third party device, the universal interface module 206 may use well-known caching techniques (e.g., data write-throughs, data write-backs, etc.) in connection with storing data in the memory 312. During a configuration time, a user may provide refresh or update parameter values indicating how often to refresh or update the data stored in the memory 312 and/or indicating how often to write back data stored in the memory 312 to respective data sources.

In the illustrated example, to ensure data integrity by detecting when data in the memory 312 may no longer be valid, the universal interface class 302 is provided with a data valid monitor 314. The data valid monitor 314 may be configured to determine when data communications with data sources have failed indicating that data in the memory 312 may no longer be the same as respective data in the respective data sources. For example, if the universal interface class 302 is used to communicate with the third party server 136 of FIG. 1 via the third party server interface 308*b*, the data store interface 310 stores accessed data in the memory 312. In the illustrated example of FIG. 2, if the third party database 138 crashes or is otherwise disabled from communicating with the universal interface module 206, the data valid monitor 314 detects failures to exchange information with the third party database 138 and/or receives a notification of the unavailability of the database 138 from a network monitor (not shown) communicatively coupled to the LAN 106. The data valid monitor 314 then generates an alert message and/or updates a data quality parameter associated with the data from the third party database 138 to indicate that the data stored in the memory 312 and corresponding to the third party database 138 may no longer be valid. In this manner, the integrity of the data stored in the memory 312 can be continuously monitored and the native components of the enterprise 100 that access data through the universal interface module 206 are protected from using invalid data.

Each of the universal interface modules 206, 210, and 212 of FIG. 2 may be configured to restrict access to particular data in data sources (e.g., the third party database 138 of FIGS. 1 and 2). To restrict particular types of data accesses and/or to restrict access to particular data, the universal interface class 302 is provided with one or more rules 316. The rules 316 restrict particular types of data access (e.g., read access, write access, etc.) to particular data sources and/or to specific data in data sources. In some example implementations, the rules 316 may be used selectively with particular ones of the data source interfaces 306 and 308*a-c*. The rules 316 may include required rules and user-selectable rules. Required rules are not configured to be disabled by a user. However, selectable rules may be enabled or disabled during a configuration phase.

To convert data access requests provided by a native component of the enterprise network 100 via the general data access interface 304 to data access request formats corresponding to each of the data source interfaces 306 and 308*a-c*, the universal interface class 302 is provided with one or more converters 318. In the illustrated example, the converters 318 receive information from the general data access interface 304 describing the data access requests, and the converters 318 convert the information into access request formats corresponding to respective ones of the data source interfaces 306 and 308a-c (e.g., formats corresponding to target data sources and communication protocols associated with those target data sources). Although the converters 318 are shown separate from the data source interfaces 306 and 308a-c, in some example implementations, each of the data source interfaces 306 and 308a-c may include a respective one of the converters 318.

To enable each of the universal interface modules 206, 210, and 212 to perform data processing operations (e.g., data filtering, data type conversion, etc.), the universal interface class 302 is provided with one or more data processing functions 320. The data processing functions 320 may include, for example, data type conversions, data conditioning functions (e.g., an averaging function, data filters, etc.), logic functions (e.g., a bit invert). A user may select which of the data processing functions 320 to use in connection with selected ones of the data source interfaces 306 and 308a-c. To generate alarms based on user-specified data, the universal interface class 302 is provided with one or more alarms 322. A user may select one or more of the alarms 322 for any desired data from a data source. The alarms 322 may be configured to monitor particular data and generate notifications when the monitored data values exceed or fall below a threshold value. The data source interfaces 306 and 308a-c, the data store interface 310, the data valid monitor 314, the rules 316, the converters 318, the functions 320, and the alarms 322 may be implemented as data members and/or function members of the universal interface class 302.

Figure 4:
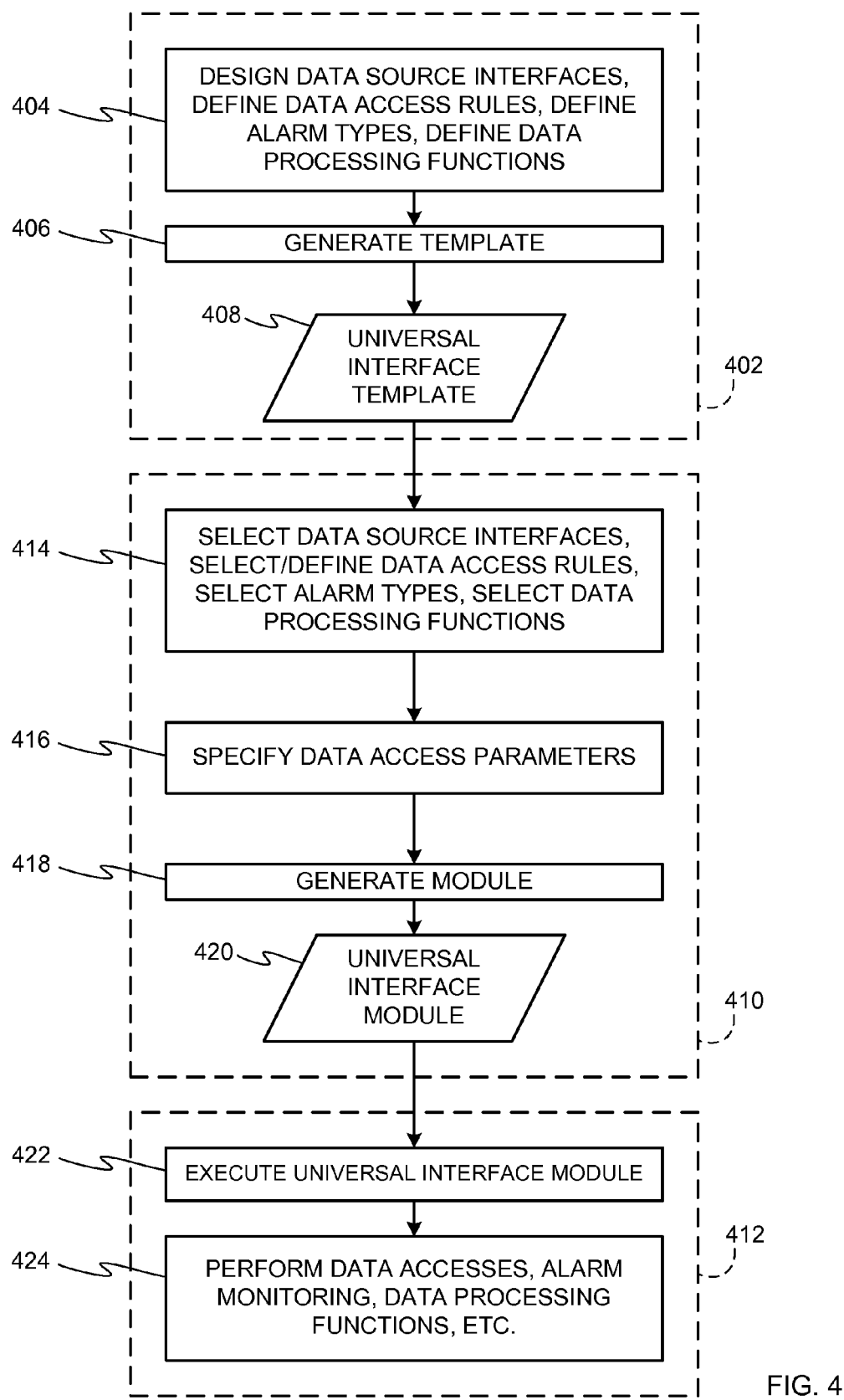
FIG. 4 depicts a flowchart of an example method that may be used to implement the universal interface module of FIG. 2.

FIG. 4 depicts a flowchart of an example method that may be used to implement each of the user interface modules 206, 210, and 212 of FIG. 2. In particular, during a design phase 402 a universal interface template designer (e.g., a software provider, a process control system vendor, an equipment manufacturer, etc.) can design or program (e.g., generate software code) user-selectable data source interfaces (e.g., the data source interfaces 306 and 308a-c of FIG. 3), define data access rules (e.g., the rules 316 of FIG. 3) (some of which may be user-selectable), define user-selectable alarm types (e.g., the alarms 318 of FIG. 3), define user-selectable data processing functions (e.g., the data processing functions 320 of FIG. 3) (block 404). Also during the design phase 402, the user-selectable data source interfaces, the data access rules, the user-selectable alarm types, and the user-selectable data processing functions provided at block 404 are used to generate a universal interface template 408 (block 406).

During a user configuration phase 410, a user can use a configuration application (which may have a configuration program graphical user interface (GUI) 700 as shown in FIG. 7) to specify a particular configuration of a universal interface module (e.g., one of the universal interface modules 206, 210, and 212 of FIG. 2) using the universal interface template 408. For example, the universal interface template 408 can provide all of the features described above in connection with FIG. 3, some of which may be user-selectable such as, for example, the data source interfaces 306 and 308a-c, some or all of the rules 316, the data access request converters 318, the data processing functions 320, and the alarms 322. The user can then select (e.g., enable) some of the blocks based on the manner in which the user would like an instance of a universal interface module to operate during a runtime phase 412. For example, as shown in FIG. 4, the user can select data source interfaces (e.g., one or more of the data source interfaces 306 and 308a-c of FIG. 3), select data access rules (e.g., one or more of the rules 316 of FIG. 3) or define user-defined rules, select alarm types (e.g., one or more of the alarms 322 of FIG. 3), and select data processing functions (e.g., one or more of the data processing functions 320 of FIG. 3) (block 414). In some example implementations, the user may elect to not make some selections. For example, the user may not select any of the alarms 322 or any of the data processing functions 320.

After making selections at block 414, the user can specify data access parameters (block 416). Data access parameters include data source paths (e.g., network paths or network addresses of the field devices 120 and 122, the PLC's 124 and 126 of FIGS. 1 and 2, and the business system 114 of FIG. 1), data to be accessed, the user-defined name to assign each datum within the universal interface module, etc. In addition, the user may define that an alarm is to be triggered based on a particular threshold level associated with data retrieved from a specified data source. A universal interface module 420 is then generated to include the user-selected features and is downloaded to a corresponding component (e.g., one of the stations 102, 104, and 112 or one of the controllers 108 and 110 of FIG. 1) of the enterprise 100 (block 418).

During the runtime phase 412, a processor system (e.g., the application station 102, the controller 116, controller 118, of FIG. 1, etc.) can execute the downloaded universal interface module 420 (block 422). The universal interface module 420 then performs data accesses, alarm monitoring, data processing functions, etc. in accordance with the user configuration specified during the configuration phase 410 (block 424).

Figure 5:
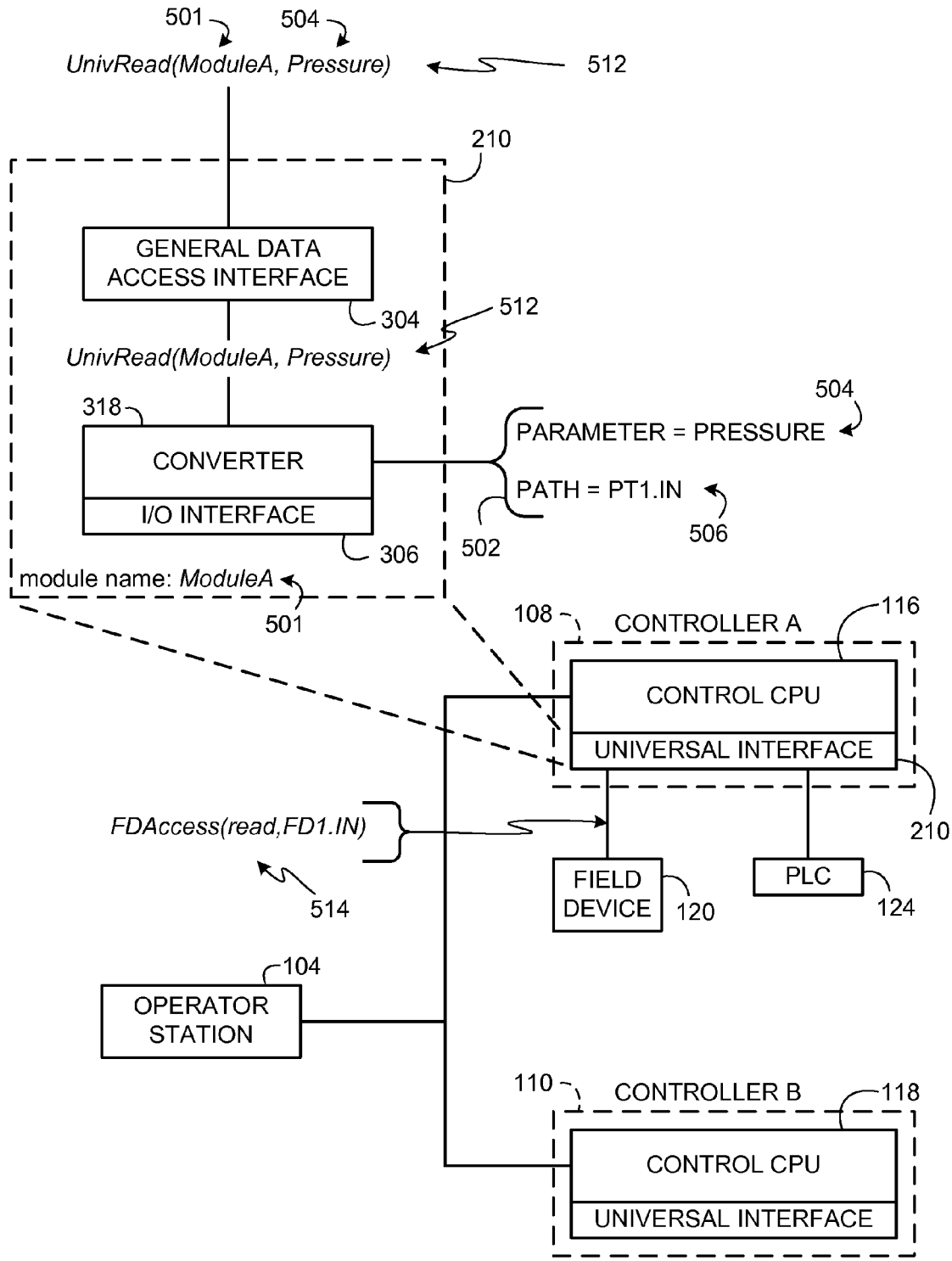
FIG. 5 depicts an example manner in which a software process can access data in a process controller via a universal interface module.

FIG. 5 depicts an example manner in which a native component of the enterprise network 100 such as, for example, the operator station 104 can access data in the controller A 108 via the universal interface module 210. In the illustrated example, the module name 501 of the universal interface module 210 is ModuleA. As shown, the universal interface module 210 is provided with a plurality of parameters 502 that include the parameter name 504 for a particular datum and a datum path 506. The native components of the enterprise 100 can use the module name 501 to uniquely identify the universal interface module 210 (i.e., the module name 501 contained in a read request 512 is uniquely associated with the universal interface module 210 executed by the controller A 108). To access data in the controller A 108, the operator station 104 uses the module name 501 and parameter name 504 configured in the universal interface module 210. In the illustrated example, the module name 501, the parameter name 504 and its associated datum path 506 are specified by a user during the configuration phase 410 of FIG. 4. The module name 501 and the parameter name 504 are used by the operator station 104 to refer to information of interest that is retrieved from the field device 120 through the controller A 108. The datum path 506 that is defined for the referenced parameter specifies the device ID (PT1) of the field device 120 and an input port (IN) of the field device 120 that generates the datum to be retrieved and stored locally in a memory (e.g., the memory 312) by the universal interface module 210.

To cause the universal interface module 210 to retrieve data from the controller A 108, the operator station 104 communicates a universal interface read function call 512 (UnivRead (ModuleA, Pressure)) to the controller A 108, which in turn passes the read function call 512 to the general data access interface 304. In the illustrated example, the format of the universal interface read function call 512 is shown as UnivRead(Module Name, Parameter Name) to specify the information of interest. The module name (e.g. Module Name=>ModuleA) is used within the enterprise network 100 (FIG. 1) to identify the data source (i.e., the module name is associated with a specific component of the enterprise network 100) from which data should be retrieved and the particular data (e.g., Parameter Name=>Pressure) to be retrieved. If an application periodically communicates data access requests to receive a parameter value, then the most recent parameter value stored in the cache memory (e.g., the memory 312) will be immediately returned to the application. Otherwise, the converter 318 uses the parameters 502 that were configured for the universal interface module 210 to generate a data access request 514 formatted in accordance with the data access request formats associated with the field device 120. In the illustrated example, the format of the data access request 514 is different from the format of the universal interface read function call 512 and is not necessarily formatted as depicted in FIG. 5. After the converter 318 generates the data access request 514, the universal interface module 210 communicates the data access request 514 to the field device 120.

In some example implementations, the universal interface module 210 may be configured to use an interface specific format to access data in data sources. An example interface specific format request that an application can communicate to the universal interface module 210 to read the parameter 'Pressure' from the module 'ModuleA' may be formatted as 'ModuleA/Pressure/PV.CV'. To return a particular data type (e.g., integer, double, float, etc.) to the requesting application from a particular data source the data access request format could be expanded to include a return data type designator and a source designator and may be formatted as 'DvRt: float//ModuleA/Pressure/PV.CV'.

Figure 6:
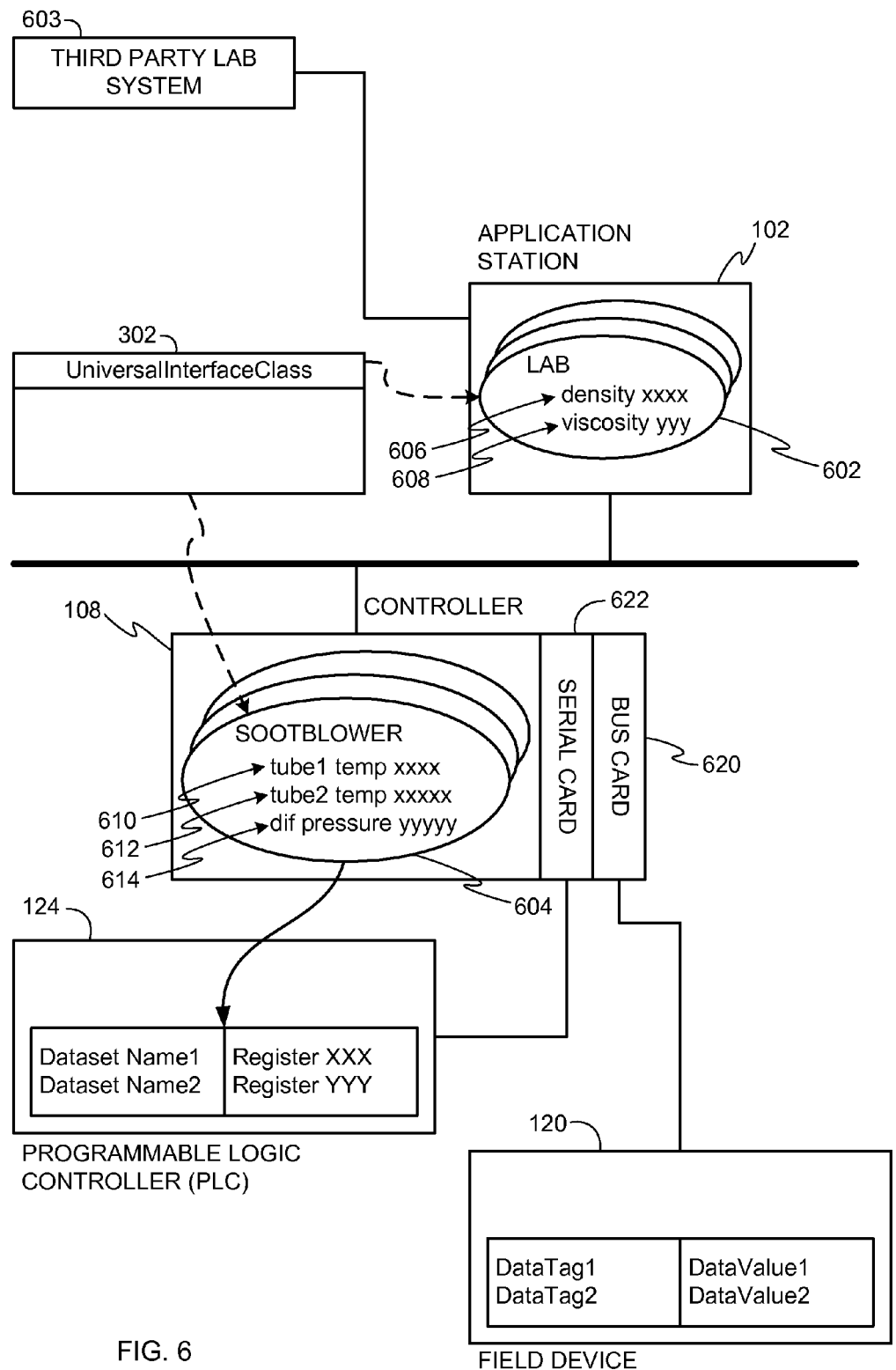
FIG. 6 is a portion of the example enterprise network of FIG. 1 in which different network entities instantiate universal interface module objects to access data in other entities communicatively coupled to the enterprise network.

FIG. 6 is a portion of the enterprise network 100 of FIG. 1 in which different network entities (e.g., the application station 102 and the controller 108 of FIG. 1) instantiate universal interface objects 602 and 604 based on the universal interface class 302 (FIG. 3) to access data in other components (e.g., the PLC 124 and the field device 120 of FIGS. 1 and 2) communicatively coupled to the controller 108. As shown, the application station 102 instantiates a LAB object 602 (i.e., a LAB universal interface module object 602) of type UniversalInterfaceClass based on the universal interface class 302. The LAB object 602 is a universal interface module named LAB. In the illustrated example, the LAB object 602 may be configured to periodically access data in a third party lab system 603 and locally cache the retrieved data in a local memory (e.g., the memory 312 of FIG. 3) to facilitate accessing the data by applications within the enterprise 100 by, for example, increasing data access speeds and/or allowing the data to be retrieved from local cache memory associated with the LAB object 602 even when a communication link between the LAB object 602 and the third party lab system 603 is disabled. The LAB object 602 defines data parameters including a density data value 606 and a viscosity data value 608. In the illustrated example, the lab system 603 provides the data corresponding to the density data value 606 and the viscosity data value 608.

Also shown, the controller 108 instantiates a SOOT-BLOWER object 604 (i.e., a SOOTBLOWER universal interface module object 604) of type UniversalInterfaceClass based on the universal interface class 302. The SOOT-BLOWER object 604 is a universal interface module named SOOTBLOWER. The SOOTBLOWER object 604 defines data parameters including a tube1_temp data value 610, a tube2_temp data value 612, and a dif_pressure data value 614. In the illustrated example, the PLC 124 provides the data corresponding to the tube1_temp data value 610 and the tube2_temp data value 612. The dif_pressure data value 614 may be generated by one of the functions 320 (FIG. 3) configured to subtract a first data value (e.g., a first pressure value) from a second data value (e.g., a second pressure value).

In the illustrated example, the controller 108 includes a bus card 620 to communicate with the field device 120 and a serial card 622 to communicate with the PLC 124. To access data in the field device 120, the SOOTBLOWER object 604 is configured to periodically access and cache data based on a user-defined parameter name in a format corresponding to the general data access interface 304 (FIG. 3) and convert the data access request to a format corresponding with the bus card 620 and the field device 120 (or the serial card 622 and the PLC 124) using, for example, one of the converters 318 of FIG. 3. In addition, to access data in the PLC 124, the SOOT-BLOWER object 604 may be configured to receive a data access request in a format corresponding to the general data access interface 304 (FIG. 3) and convert the data access request to a format corresponding with the bus card 620 and the field device 120 (or the serial card 622 and the PLC 124) using, for example, one of the converters 318 of FIG. 3.

The configuration (e.g., the module names LAB and SOOTBLOWER, the parameter names for each module, the data processing functions, the data path, etc.) of the LAB object 602 and the SOOTBLOWER object 604 can be specified by a user during a configuration phase (e.g., the configuration phase 410 of FIG. 4). The application station 102 and the controller 108 can then execute respective ones of the LAB object 602 and the SOOTBLOWER object 604 during a runtime phase (e.g., the runtime phase 412 of FIG. 4) to perform the user-specified operations.

FIG. 7 is an example configuration program graphical user interface (GUI) 700 that may be used during a configuration phase (e.g., the configuration phase 410 of FIG. 4) to configure the universal interface LAB module 602 of FIG. 6. In some example implementations, the configuration program GUI 700 is provided as part of a control system software suite (e.g., the DeltaV Digital Automation System by Emerson Process Management™) to enable users to configure universal interface modules (e.g., the LAB universal interface module object 602 or any other universal interface module).

The configuration program GUI 700 allows users to provide a unique module name for each instance of a universal interface module. In addition, the user may provide user-defined parameter names for data that will be accessed through instances of universal interface modules. Also, the user may specify which parameters are to be periodically refreshed and cached (e.g., in the memory 312 of FIG. 3) in the universal interface module. Typically, the parameters of a module and the features that have been selected for each parameter will be displayed during the configuration stage using a table (or a spreadsheet) in which each row of the table represents the features described above in connection with FIG. 3 to specify how the LAB universal interface module object 602 should function during a runtime phase (e.g., the runtime phase 412 of FIG. 4).

To display user-editable parameter values associated with data source interfaces (e.g., one of the data source interfaces 306 and 308*a-c* of FIG. 3), alarms (e.g., the alarms 322 of FIG. 3), rules (e.g., the rules 316 of FIG. 3), data process functions (e.g., the data process functions 320 of FIG. 3), etc., the configuration program GUI 700 is provided with a parameter editing area 710. In the illustrated example, the parameter editing area 710 displays parameter values in a tabular or spreadsheet format. The parameter values may be stored (e.g., by selecting a 'store parameter' option) in a spreadsheet file, text file, extensible markup language (XML) file, or any other file that may be imported into the spreadsheet view of the GUI 700. A user may use the GUI 700 to view and edit the parameters of the spreadsheet file, text file, XML file, etc. via the spreadsheet view of the GUI 700 to change how the LAB universal interface module object 602 operates.

When a user adds a data parameter to a universal interface module and gives the data parameter a name, then the user may provide the information required to access and process the information of interest via the universal interface module. In the illustrated example of FIG. 7, the program configuration GUI 700 is provided with a data type field 712, a read only field 714, a path field 716, and an update time field (or an update interval field) 718. The data type field 712 enables the user to specify the data type (e.g., floating point, integer, etc.) of the datum to be accessed. The read only field 714 enables the user to indicate whether the data parameter should be read only.

The path field 716 enables the user to specify the path of the data parameter within the enterprise network 100 (FIG. 1) and the data source that generates and/or stores the data. The path specified in the path field causes the universal interface module to select a corresponding data source interface. For example, if the path corresponds to a native field device, the universal interface module selects the I/O interface 306 of FIG. 3. Otherwise, if the path corresponds to a third party data source, the universal interface module selects one of the third party interfaces 308*a-c*.

The update time field 718 enables a user to specify how often the universal interface module should refresh the locally stored datum (i.e., the datum value stored locally in the memory 312 of FIG. 3). For example, if the datum corresponds to a high-speed field device, the user may specify a short update time that causes the universal interface module to refresh the datum at a relatively high frequency. On the other hand, if the datum corresponds to a parameter in a field device that is updated once-per-day, the user may specify a long update time that causes the universal interface module to refresh the datum at a relatively low frequency. In any case, the datum value is stored locally in, for example, the memory 312 so that whenever a read request for that datum value is received at the universal interface module, the universal interface module can retrieve the datum value from the local memory 312 instead of having to establish communications with, for example, a field device (e.g., the field device 120 of FIG. 2), a PLC (e.g., the PLC 124 of FIG. 2) or any other component coupled to the universal interface module.

The program configuration GUI 700 is also provided with an alarm field 720, an alarm value field 722, and a math stat/fn field 724. The alarm field 720 enables a user to specify whether an alarm should be armed for the corresponding datum. The alarm value field 722 enables a user to specify a minimum and/or a maximum threshold value that will cause the alarm to be triggered based on the datum value. Alarm detection may be defined for any parameter configured in a universal interface module. In some example implementations, when an alarm condition is detected, the alarm is automatically reported to the operator station 104 (FIG. 1) in the same manner as alarms are reported for other modules (e.g., control process modules) within the enterprise network 100. The math stat/fn field 724 enables a user to specify whether any statistical, mathematical, or other processing function should be performed on corresponding data.

FIG. 8 is an example runtime GUI 800 that may be used to display data accessed using a universal interface module during an execution phase (e.g., the execution phase 406 of FIG. 4). The example runtime GUI 800 is provided with a display area 810 implemented using a tabular or spreadsheet format that shows the runtime operating values associated with the configured parameters. In the illustrated example, the example runtime GUI 800 is provided with actual value fields 812 to display the values of data retrieved from respective data sources (e.g., the field device 120 or the PLC 124 of FIGS. 1 and 2). The example runtime GUI 800 is also provided with data quality fields 814 to display data quality parameters associated with respective data to indicate that the data stored locally in, for example, the memory 312 of FIG. 3 may no longer be valid. In this manner, the integrity of the data stored in the memory 312 can be continuously monitored and the native components of the enterprise 100 that access data through universal interface modules are protected from using invalid data.

Figure 9:
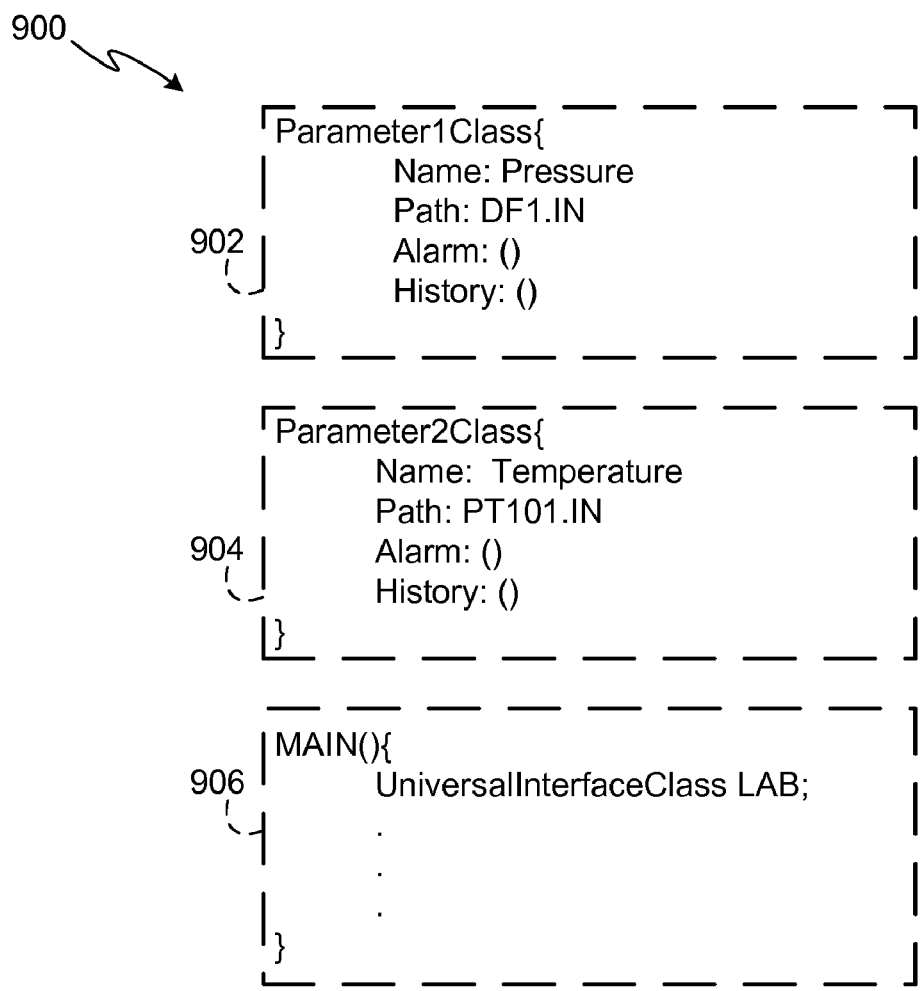
FIG. 9 depicts a pre-compilation staging area that includes example software instructions generated based on the user-specified configuration provided via the configuration program GUI of FIG. 7.

FIG. 9 depicts a pre-compilation staging area 900 (e.g., a software file) that includes example software instructions generated based on a user-specified configuration specified via the configuration program GUI 700 of FIG. 7. In the illustrated example, each of the entries associated with a parameter of a universal interface module corresponds to a function performed during a runtime phase (e.g., the runtime phase 412 of FIG. 4). During a configuration phase (e.g., the configuration phase 410 of FIG. 4), when a user finishes specifying the information needed for each parameter of a universal interface module configuration and selects a compile or generate option, a configuration program generates the universal information module information in the pre-compilation staging area 900 to generate a universal interface module (e.g., the universal interface module 420 of FIG. 4). In this manner, the universal interface module can be executed during a runtime phase (e.g., the runtime phase 412 of FIG. 4).

In the illustrated example of FIG. 9, the pre-compilation staging area 900 is provided with parameter definitions 902 and 904. In addition, the pre-compilation staging area 900 is provided with a main function 906 in which a LAB object (e.g., LAB object 602 of FIG. 6) of type UniversalInterfaceClass (based on the universal interface class 302 of FIG. 3) can be instantiated. In addition, although not shown, the main function 906 includes software instructions to enable operations associated with the parameter definitions 902 and 904.

Figure 10:
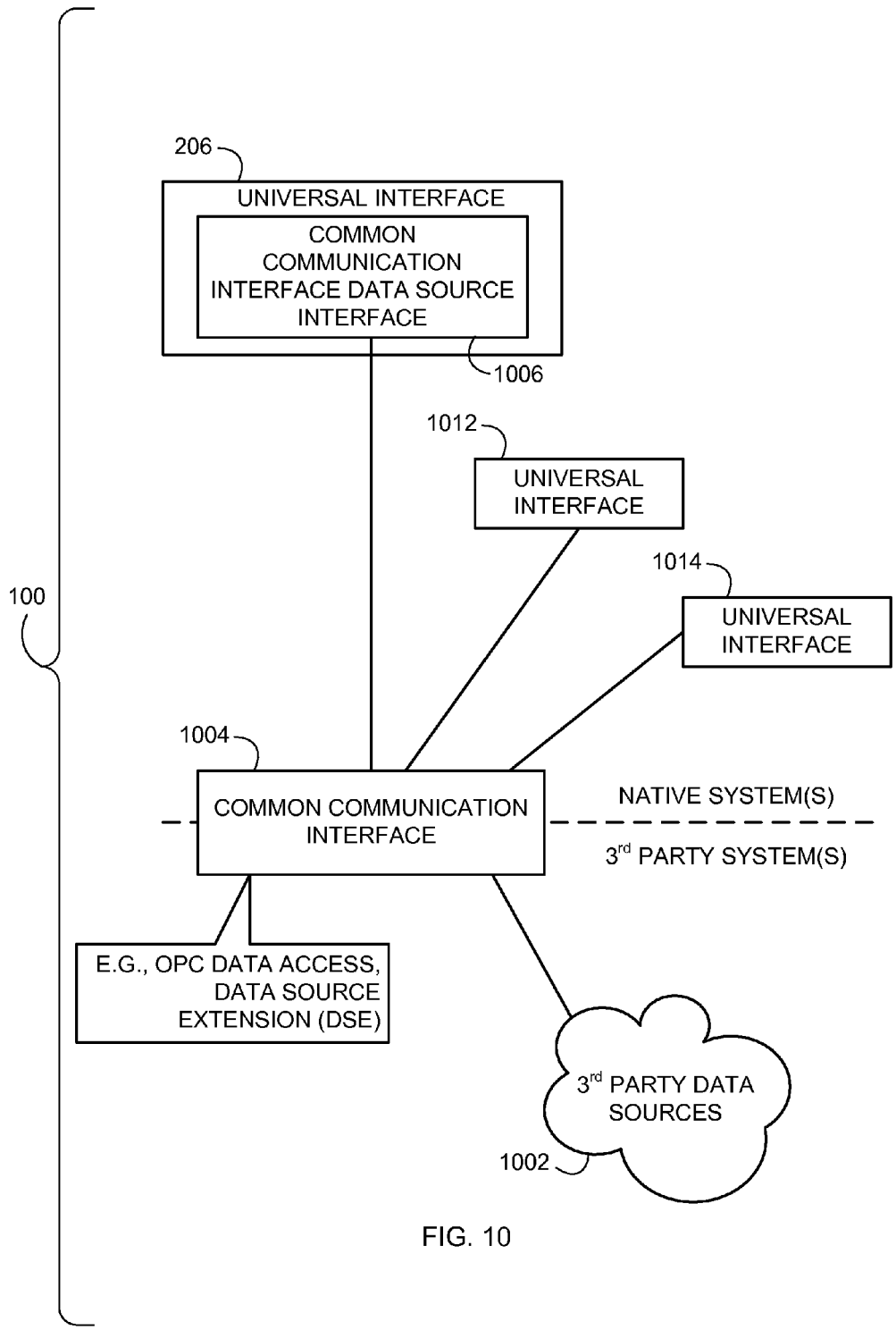
FIG. 10 depicts an example common communication interface via which a universal interface module can communicate with third party data sources.

FIG. 10 depicts an example implementation in which the universal interface module 206 communicates with third party data sources 1002 via a common communication interface 1004. As shown, other universal interface modules 1012 and 1014 can also communicate with the third party data sources 1002 via the common communication interface 1004. Example common communication interfaces that may be used to implement the common communication interface 1004 include the well-known industry standard OPC (based on Microsoft Corporation's OLE (Object Linking and Embedding)/COM (Component Object Model) standard). The common communication interface 1004 provides a relatively high-degree of interoperability between client and server applications supplied by different suppliers or designed in accordance with different standards. In the past, client application suppliers had to develop a different driver to interface with each control device. The common communication interface 1004 enables the universal interface module 206 to access the third party data sources 1002 using one type of interface shown in FIG. 10 as a common communication data source interface 1006. In the illustrated example of FIG. 10, the common communication data source interface 1006 may be used instead of or in addition to the third party data source interfaces 308*a-c* described above in connection with FIG. 3.

The universal interface module 206 can communicate with any of the third party data sources 1002 using the same function calls enabled by the common communication interface 1004. That is, the common communication interface 1004 isolates the universal interface module 206 from having to know all of the communication standards associated with each of the third party data sources 1002. Of course, in other example implementations as described above, the universal interface module 206 may be provided with third party data source interfaces (e.g., the third party data source interfaces 308a-c) to communicate directly with the third party data sources 1002.

Figure 11:
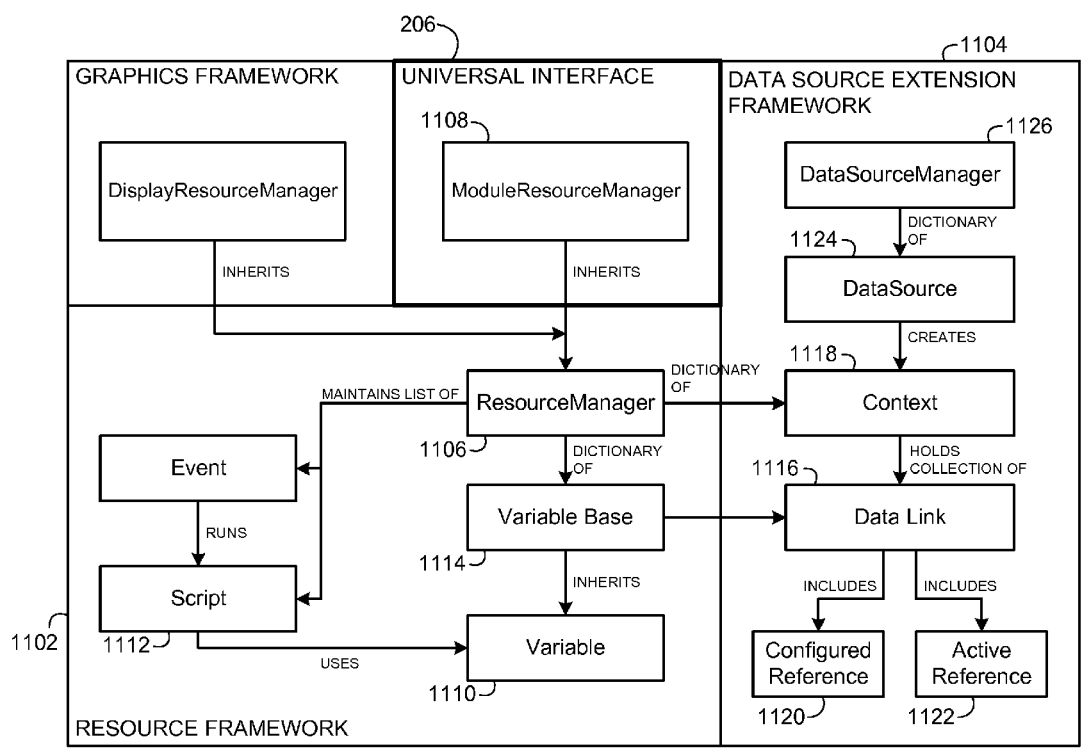
FIG. 11 illustrates a resource framework and a data source extension (DSE) framework that may be used to implement the common communication interface of FIG. 10.

FIG. 11 illustrates a resource framework 1102 and a data source extension (DSE) framework 1104 that may be used to implement the common communication interface 1004 of FIG. 10. In general, the resource framework 1102 is configured to implement data binding-related processes and includes a resource manager 1106, which creates and tracks variables, scripts, and references to data sources (e.g., the third party data sources 1002 of FIG. 10) as described in detail below. Each universal interface module (e.g., the universal interface module 206) is managed by a respective resource manager instance (e.g., the resource manager 1106). For example, the resource framework 1102 may include a plurality of resource manager instances similar to the resource manager 1106, each of which is uniquely associated with a different universal interface module. As shown in FIG. 11, the universal interface module 206 is provided with a module resource manager 1108 that inherits characteristics or properties (e.g., data members and function members) from the resource manager 1106. The module resource manager 1108 may be implemented in the common communication interface data source interface 1006 (FIG. 10) and is associated with one or more variables 1110, scripts (i.e., executable software scripts) 1112, and data source references stored in a variable base 1114. The variable base 1114 couples, links, or binds the variables 1110, the scripts (i.e., executable software scripts) 1112, and the data source references stored in a variable base 1114 via one or more data links or data link object(s) 1116 (i.e., the bindings or binding object(s) 1116) of a context 1118 to one or more data services or data sources (e.g., the third party data sources 1002 of FIG. 10).

In the illustrated example, the data links 1116 are communicatively coupled to the third party data sources 1002 (FIG. 10) via configured references 1120 and active references 1122. The configured and active references 1120 and 1122 are string objects that contain information (e.g., network path information) needed by the DSE framework 1104 to locate particular data items. In the illustrated example, aliases (e.g., variable names) of the active references 1122 must be fully resolved (i.e., the aliases must be translated to or associated with respective network paths) but the configured references 1120 may contain unresolved aliases.

The data link 1116 may include a string representation of the location of a specific data item within a data source (e.g., one of the third party data sources 1002 of FIG. 10) and, thus, the data link 1116 is specific to a data source. Additionally, the string representation may contain a reference to an alias, which may be changed during runtime. As shown, the context 1118 is also coupled to a data source 1124 (e.g., a runtime data source) and a data source manager 1126, which is discussed below.

As depicted in FIG. 11, the resource manager 1106 receives a data context from the module resource manager 1108. In general, the data context is composed of properties (e.g., variable names, data source ID, etc.) used by the module resource manager 1108. The resource manager 1106 is configured to map, relate, or otherwise associate the properties associated with the data context to appropriate ones of the variables 1110, scripts 1112, and references in the variable base 1114. Additionally, the resource manager 1106 may be further configured to map, relate, or otherwise associate the properties to one or more of the third party data sources 1002 via the bindings 1116, the context 1118, and the data source manager 1126. The mappings used by the resource manager 1106 to relate the properties of the module resource manager 1108 to the variables 1110, the scripts 1112, the references in the variable base 1114, and/or the third party data sources 1002 can be established during a system configuration operation (e.g., the configuration phase 410 of FIG. 4) by, for example, a configuration engineer or any other system user.

In operation, the resource manager 1106 may receive information related to a change in variables, values to be written to data sources, etc. In some cases, the data change may be conveyed via a change in the data context that is provided to the resource manager 1106 by the module resource manager 1108. More specifically, in those cases, a user-initiated change or a change made by the software process 202 of FIG. 2 to one or more of the data context properties may invoke one or more of the scripts 1112 to cause one or more of the values associated with the variables 1110 and/or the references in the variable base 1114 to change. In cases where the changes are related to data stored in one or more of the third party data sources 1002, changes to the objects managed by the resource manager 1106 may then be automatically propagated to an appropriate one or more of the third party data sources 1002 via the bindings 1116 and the context object 1118. In other cases, data changes may occur within one or more of the third party data sources 1002 (e.g., as a result of a change in process variables referenced) and the changes may be automatically propagated via the context 1118 and bindings 1116 to appropriate ones of the properties stored in the module resource manager 1108 of the universal interface module 206 via the mapping functionality provided by the resource manager 1106.

The data source manager 1126 creates and manages context objects (e.g., the context object 1118), which are used to maintain client state information relating to a collection of binding objects (e.g., the data link 1116) associated with a data source (e.g., one of the third party data sources 1002). In the case of the universal interface module 206, there is a one-to-one correspondence between the context objects 1118 and respective third party data source interfaces (e.g., the common communication interface data source interface 1006 of FIG. 10 and/or the third party data source interfaces 308a-c of FIG. 3). In other words, there is one context per data source interface in the universal interface module 206 and each context contains only the bindings associated with that data source interface. Thus, in the example of FIG. 11, the context object 1118 corresponds uniquely to, for example, the common communication interface data source interface 1006 of FIG. 10.

A context object also provides data update mechanisms, one of which is event based and initiates updates in response to each and every event, and another of which is collated in nature and collects a plurality of data change events and periodically (e.g., based on a timer) initiates updates by sending a list of changed binding items to a data source in response to the timer. Of course, responding individually to each event may impair performance (e.g., slow responsiveness) of a runtime process and/or a process control system in the enterprise 100 of FIG. 1 if there is a relatively large number of events to process. Thus, responding periodically to a list of dirty bindings (e.g., collected bindings for which data has changed but has not yet been passed to a runtime process) may improve overall performance. Connections between the context object 1118 and the third party data sources 1002 may be implemented using, for example, the Indigo framework provided by the Microsoft Corporation.

Although the flow of change information associated with the example of FIG. 11 is described as being initiated at the universal interface module 206 and automatically propagated to one or more of the third party data sources 1002 via the resource manager 1106, the data link 1116, the data source manager 1126, and the context 1118, data change information could alternatively or additionally be automatically propagated from one or more of the third party data sources 1002 to the universal interface module 206. Further details of the resource framework 1102 and the DSE framework 1104 are provided in PCT patent application no. PCT/US2005/015394 filed on May 4, 2005, the specification of which is hereby incorporated herein by reference in its entirety.

FIGS. 12, 13A, 13B, and 13C are flowcharts of example methods that may be used to implement the example universal interface modules 206, 210, and 212 (FIG. 2). For purposes of discussion, the flowcharts are described below in connection with the universal interface module 206. In some example implementations, the example methods of FIGS. 12, 13A, 13B, and 13C may be implemented using machine readable instructions comprising a program for execution by a processor (e.g., the processor 1412 shown in the example processor system 1410 of FIG. 14). The program may be embodied in software stored on a tangible medium such as a CD-ROM, a floppy disk, a hard drive, a digital versatile disk (DVD), or a memory associated with the processor 1412 and/or embodied in firmware and/or dedicated hardware in a well-known manner. Further, although the example program is described with reference to the flowcharts illustrated in FIGS. 12, 13A, 13B, and 13C, persons of ordinary skill in the art will readily appreciate that many other methods of implementing the example universal interface module 206 may alternatively be used. For example, the order of execution of the blocks may be changed, and/or some of the blocks described may be changed, eliminated, or combined.

Figure 12:
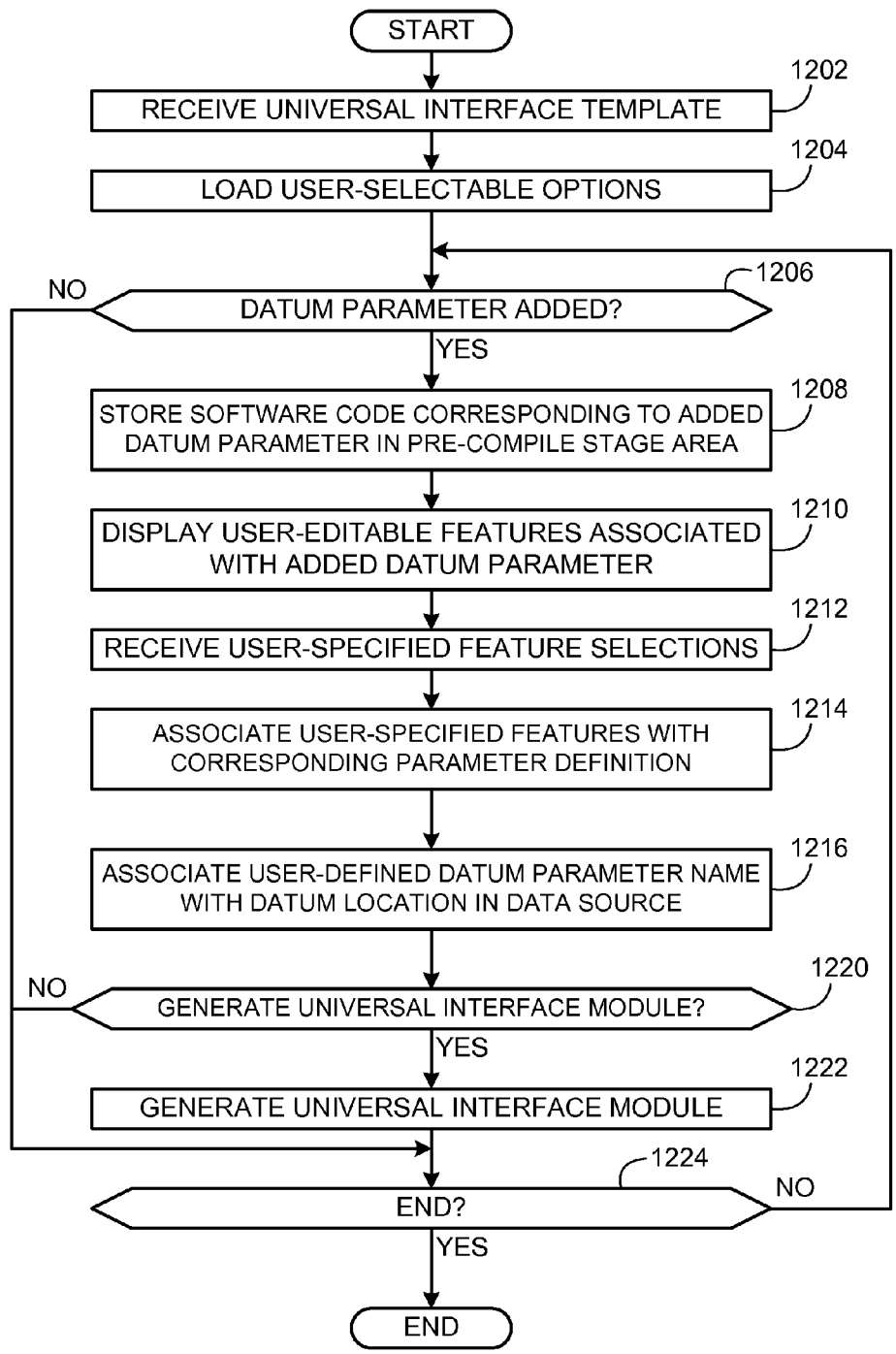
FIG. 12 depicts a flowchart of an example method that may be used to enable a user to configure a universal interface module during a configuration phase.

Turning now to FIG. 12, the example method depicted therein may be implemented during the configuration phase 410 of FIG. 4 to enable a user to specify a particular configuration for the universal interface module 206. In this manner, the user can specify data sources that the universal interface module 206 is to access, and the user can also specify any other operations (e.g., data processing operations, alarm generating operations, etc.) that the universal interface module 206 is to perform. In the illustrated example, the example method of FIG. 12 is described in connection with the example configuration program GUI 700 of FIG. 7 and the pre-compilation staging area 900 of FIG. 9. However, it is not necessary that the example method of FIG. 12 be implemented in connection with the configuration program GUI 700 or with any other GUI-based program. For example, in some example implementations, the example method of FIG. 12 may be implemented using a text-based user interface (e.g., a command line interface) or any other type of user interface.

As shown in FIG. 12, initially, the configuration program GUI 700 receives (or retrieves) a universal interface template (block 1202) (e.g., the universal interface template 408 of FIG. 4). The configuration program GUI 700 then loads user-selectable options or features (block 1204) provided by the universal interface template 408. For example, the configuration program GUI 700 can populate drop-down menus with selectable data source paths, data types, data process functions, types of alarms, update times, etc.

The configuration program GUI 700 then determines whether a datum parameter (e.g., a pressure datum parameter) has been added to the module (block 1206). If the configuration program GUI 700 determines that a datum parameter has been added (block 1206), the configuration program GUI 700 stores software code corresponding to the added parameter in the pre-compilation staging area 900 (FIG. 9) (block 1208). For example, the configuration program GUI 700 can store a parameter definition (e.g., one of the parameter definitions 902 and 904 of FIG. 9).

The configuration program GUI 700 then displays the user-selectable or user-editable features in the parameter editing area 710 (FIG. 7) (block 1210). The configuration program GUI 700 then receives user-specified feature selections for the added datum parameter (block 1212). The configuration program GUI 700 associates the user-specified features with a respective parameter definition in the pre-compilation staging area 900 (block 1214). The configuration program GUI 700 associates a user-defined datum parameter name with a datum location in a respective data source (block 1216). For example, if the user-defined datum parameter name is 'pressure' as shown in FIG. 7 and a location of the datum value to be accessed is an 'IN' port in a field device having an ID of 'PT1' (FIGS. 5 and 7), the configuration program GUI 700 associates the user-defined datum parameter name pressure with the location of the datum PT1.IN within the enterprise network 100 to enable native components of the enterprise network 100 to reference and access the datum value at PT1.IN based on the user-defined datum parameter name 'pressure.'

A configuration program (e.g., a configuration program corresponding to the configuration program GUI 700) determines whether it should generate the universal interface module 206 of FIG. 2 (block 1220). For example, the configuration program may determine that it should generate the universal interface module 206 if a user selects a compile option or a generate option (not shown) on the configuration program GUI 700. If the configuration program determines that it should generate the universal interface module 206 (block 1220), the configuration program generates the universal interface module 206 (block 1222) based on the information in the pre-compilation staging area 900. After generating the universal interface module 206 (block 1222) or if the configuration program determines that it should not generate the compiled user interface 206 (block 1220) or if the configuration program GUI 700 determines that a datum parameter has not been added (block 1206), the configuration program determines whether it should end the example method of FIG. 12 (block 1224). For example, if a user exits out of the configuration program GUI 700 or closes a current configuration workspace, the configuration program determines that it should end the example method. If the configuration program determines that it should not end the example method, control is returned to block 1206. Otherwise, the example method of FIG. 12 is ended.

Figure 13A:
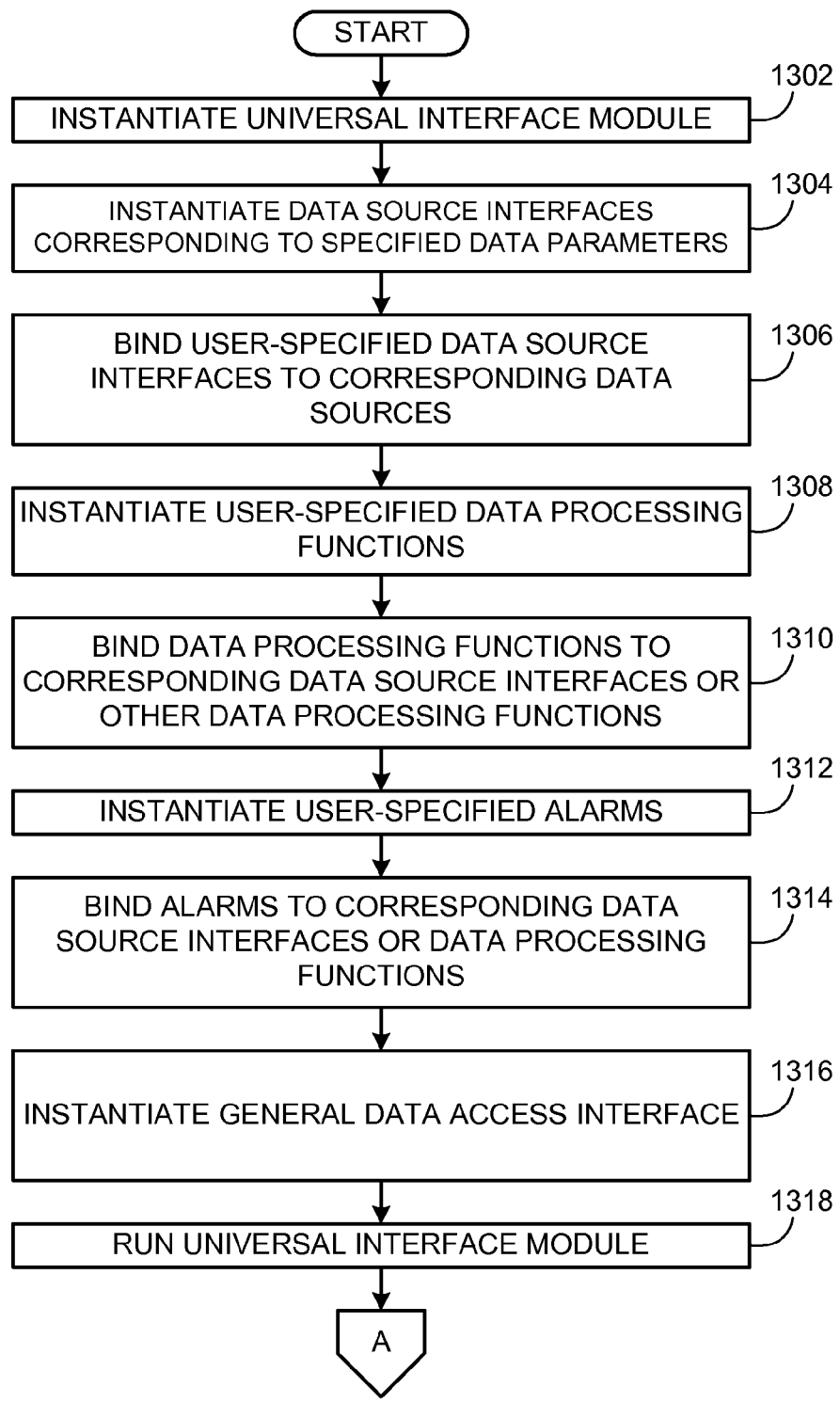
FIGS. 13A, 13B, and 13C depict a flowchart of an example method that may be used to implement a universal interface module during a runtime phase.
Figure 13B:
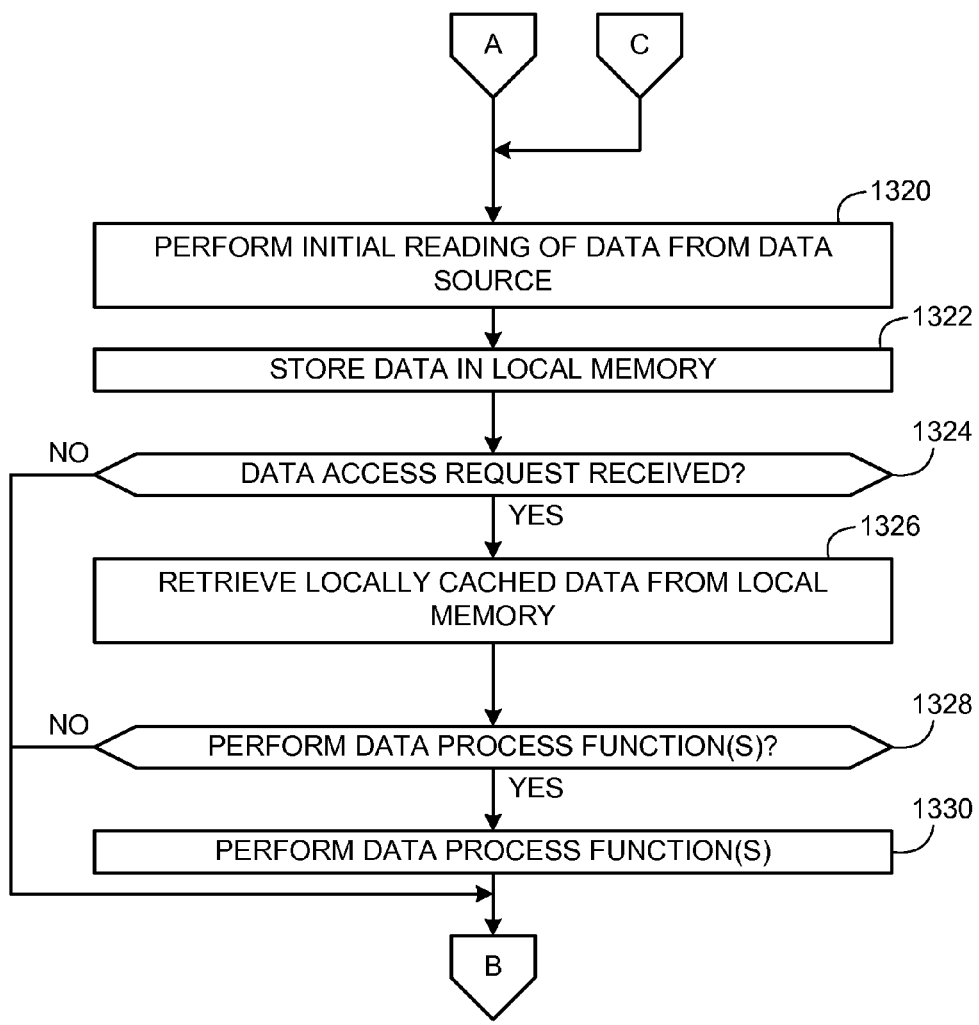
Figure 13C:
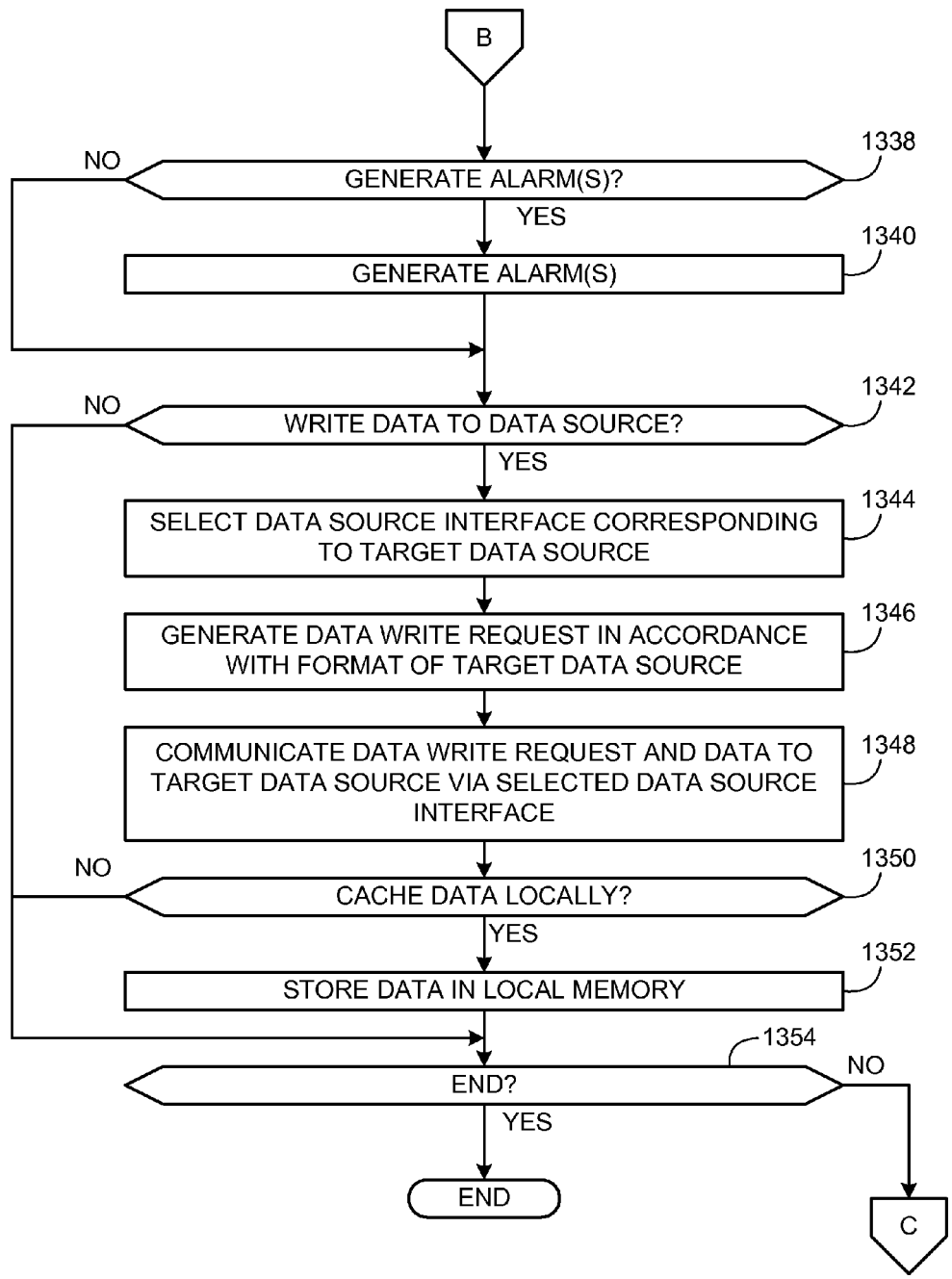

Turning now to FIGS. 13A, 13B, and 13C, the example method depicted therein may be implemented during the runtime phase 412 of FIG. 4 to enable the universal interface module 206 to access data in one or more data sources. For purposes of discussion, the example method of FIGS. 13A, 13B, and 13C is described below as being implemented by the application station 102 (FIGS. 1 and 2). However, the example method may be implemented using any other processor system or apparatus. Initially, the application station 102 instantiates the universal interface module 206 (block

1302). For example, the application station 102 can instantiate a universal interface module object of type universal interface class. The application station 102 then instantiates the data source interface(s) corresponding to user-specified parameters (block 1304) (e.g., one or more of the data source interfaces 306 and 308 a-c of FIG. 3). The application station 102 then binds the data source interfaces to corresponding data sources (block 1306). For example, the application station 102 can set the module name 501 of FIG. 5 equal to the user-specified module name LAB and the plurality of parameters 502 (FIG. 5) equal to the user-specified datum parameter name and path.

The application station 102 then instantiates user-specified data processing functions (block 1308). For example, the application station 102 can instantiate one or more of the data processing functions 320 of FIG. 3. The application station 102 then binds the user-specified data processing functions to corresponding data source interfaces or other data processing functions (block 1310). For example, the application station 102 can bind the user-specified data processing functions to corresponding ones of the data source interfaces 306 and 308a-c that were instantiated at block 1304. The application station 102 then instantiates user-specified alarm functions (block 1312). For example, the application station 102 can instantiate one or more of the alarms 322 of FIG. 3. The application station 102 then binds enabled ones of the alarms 422 to the universal interface module 206 (block 1314). For example, the application station 102 can bind the alarms to respective datum parameters. The application station 102 then instantiates the general data access interface 304 (FIG. 3) (block 1316) and runs (or executes) the universal interface module 206 (block 1318).

The universal interface module 206 performs an initial reading of user-specified data from one or more corresponding data sources (block 1320) (FIG. 13B). For example, if the user-specified data includes third party data, the universal interface module 206 reads data from the third party database 138 (FIG. 2). The universal interface module 206 then stores the data in local memory (block 1322) such as, for example, the memory 312 of FIG. 3. The universal interface module 206 can subsequently read the data from the third party database 138 periodically or aperiodically based on the update time or interval value stored in the update time field of FIG. 7. The universal interface module 206 determines whether it has received a data access request from a data source (block 1324) (FIG. 13B). For example, if the universal interface module 206 receives the universal interface read function call 512 (FIG. 5) from another component or network entity of the enterprise network 100 (FIG. 1), the universal interface module 206 determines that it has received a data access request.

If the universal interface module 206 determines that it has received a data access request (block 1324), the universal interface module 206 retrieves the requested locally cached data from the memory 312 (block 1326) using, for example, the data store interface 310 (FIG. 3). The universal interface module 206 determines whether it should perform one or more data process functions (block 1328). For example, if a user-specified function is instantiated in the universal interface module 206 for the requested data, the universal interface module 206 performs one or more data processing functions on the requested data (block 1330). The data process functions may be performed at any time and need not be performed only when a data access request is received by the universal interface module 206.

After performing the data process function(s) (block 1330) or if the universal interface module 206 determines that it has not received a data access request (block 1324), the universal interface module 206 determines whether it should generate one or more alarms (block 1338) (FIG. 13C) (e.g., an alarm corresponding to the alarm field of FIG. 8). For example, if updated data is available for one of the alarms 322 (FIG. 3) instantiated at block 1312 (FIG. 13A) and the updated data is lower than a user-specified lower limit threshold or higher than a user-specified upper limit threshold, then the universal interface module 206 generates the alarm (block 1340).

After the universal interface module 206 generates the alarm(s) (block 1340) or if the universal interface module 206 determines that it should not generate the alarm(s) (block 1338), the universal interface module 206 determines whether it should write data to a data source (block 1342). For example, if the universal interface module 206 receives a universal interface write function call from a native component or network entity of the enterprise network 100 (FIG. 1) or if a user configured the universal interface module 206 during the configuration phase 410 (FIG. 4) to periodically write particular information to a particular data source, the universal interface module 206 determines that it should write data to a data source.

If the universal interface module 206 determines that it should write data to a specified data source (block 1342), the universal interface module 206 selects one of the data source interfaces 306 and 308a-c corresponding to the specified target data source (block 1344). One of the converters 318 (FIG. 3) then generates a data write request (e.g., a write data function call) in accordance with the format of the target data source (block 1346). The data source interface (e.g., the I/O interface 306 of FIGS. 3 and 5 for native data sources or the third party interfaces 308a-c of FIG. 3 for third party data sources) corresponding to the target data source then communicates the data write request and the data to be written to the target data source.

The universal interface module 206 then determines whether it should cache the data locally (block 1350) in, for example, the memory 312. For example, a user may specify during the configuration phase 410 (FIG. 4) what data should be cached locally. If the universal interface module 206 determines that it should cache the data locally (block 1350), then the data store interface 310 (FIG. 3) stores the data in the memory 312 (block 1352). After the data store interface 310 stores the data in the memory 312 or if the universal interface module 206 determines that it should not cache the data locally (block 1350), the universal interface module 206 determines whether it should end its operations (block 1354). For example, a user or a software process (e.g., the software process 202 of FIG. 2) may terminate the universal interface module 206. If the universal interface module 206 determines that it should not end its operations, control is passed back to block 1320 of FIG. 13B. Otherwise, the example method of FIGS. 13A, 13B, and 13C is ended.

Figure 14:
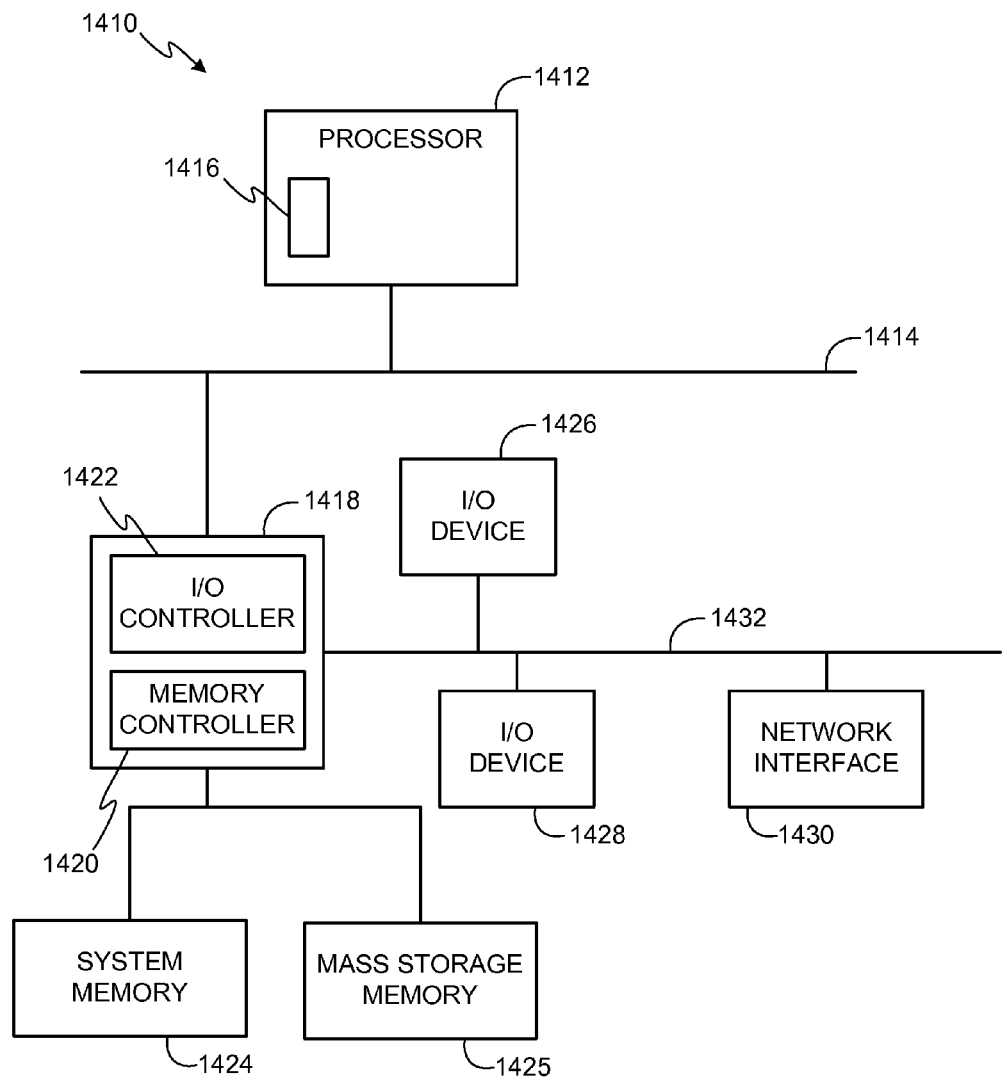
FIG. 14 is a block diagram of an example processor system that may be used to implement the example apparatus and methods described herein.

FIG. 14 is a block diagram of an example processor system 1410 that may be used to implement the apparatus and methods described herein. As shown in FIG. 14, the processor system 1410 includes a processor 1412 that is coupled to an interconnection bus 1414. The processor 1412 includes a register set or register space 1416, which is depicted in FIG. 14 as being entirely on-chip, but which could alternatively be located entirely or partially off-chip and directly coupled to the processor 1412 via dedicated electrical connections and/or via the interconnection bus 1414. The processor 1412 may be any suitable processor, processing unit or microprocessor. Although not shown in FIG. 14, the system 1410 may be a multi-processor system and, thus, may include one or more additional processors that are identical or similar to the processor 1412 and that are communicatively coupled to the interconnection bus 1414.

The processor 1412 of FIG. 14 is coupled to a chipset 1418, which includes a memory controller 1420 and a peripheral input/output (I/O) controller 1422. As is well known, a chipset typically provides I/O and memory management functions as well as a plurality of general purpose and/or special purpose registers, timers, etc. that are accessible or used by one or more processors coupled to the chipset 1418. The memory controller 1420 performs functions that enable the processor 1412 (or processors if there are multiple processors) to access a system memory 1424 and a mass storage memory 1425.

The system memory 1424 may include any desired type of volatile and/or non-volatile memory such as, for example, static random access memory (SRAM), dynamic random access memory (DRAM), flash memory, read-only memory (ROM), etc. The mass storage memory 1425 may include any desired type of mass storage device including hard disk drives, optical drives, tape storage devices, etc.

The peripheral I/O controller 1422 performs functions that enable the processor 1412 to communicate with peripheral input/output (I/O) devices 1426 and 1428 and a network interface 1430 via a peripheral I/O bus 1432. The I/O devices 1426 and 1428 may be any desired type of I/O device such as, for example, a keyboard, a video display or monitor, a mouse, etc. The network interface 1430 may be, for example, an Ethernet device, an asynchronous transfer mode (ATM) device, an 802.11 device, a DSL modem, a cable modem, a cellular modem, etc. that enables the processor system 1410 to communicate with another processor system.

While the memory controller 1420 and the I/O controller 1422 are depicted in FIG. 14 as separate functional blocks within the chipset 1418, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. An apparatus to access information associated with a process control system, the apparatus comprising:
    a processor system; and
    a memory communicatively coupled to the processor system, the memory including stored instructions that enable the processor system to:
        assign a first user-defined parameter name to a first data source operating according to a first access protocol;
        store identifying information in connection with the first user-defined parameter name, the identifying information being indicative of a location at which data from the first data source can be obtained;
        configure a first interface assigned to the first data source to enable a second interface assigned to a second data source to submit to the first interface a data request including the first user-defined parameter name, the data request being of a second access protocol different from the first access protocol, wherein the first and second interfaces are instances of a particular object class, wherein the second interface is to access the second data source in response to receiving a second data request including a second user-defined parameter name;
        in response to the data request of the second access protocol, access the first data source using the first access protocol and the identifying information using the first interface to provide a data value from the first data source to the second interface;
        generate a third data request having a third access protocol associated with a third data source, the third data request excluding identifying information defining a location of the third data source; and
        receive data from the third data source based on the third request.

2. An apparatus as defined in claim 1, wherein the first data source is one of a control system field device, a programmable logic controller, or a process control server.

3. An apparatus as defined in claim 1, wherein the stored instructions enable the processor system to display a tabular graphical user interface having a plurality of user-selectable fields to enable a user to specify the first user-defined parameter name.

4. An apparatus as defined in claim 1, wherein the stored instructions enable the processor system to store the first interface in a module data structure that can be communicated to a network entity to be executed by the network entity.

5. An apparatus as defined in claim 1, wherein the first interface is configured to access the first data source via a common communication interface.

6. An apparatus as defined in claim 5, wherein the common communication interface is implemented using an object linking and embedding standard.

7. An apparatus as defined in claim 1, wherein the stored instructions enable the processor system to enable a data processing function to configure the first interface to perform a mathematical operation on the data value.

8. An apparatus as defined in claim 1, wherein the stored instructions enable the processor system to enable an alarm function to configure the first interface to generate an alarm based on the data value.

9. An apparatus as defined in claim 1, wherein the stored instructions enable the processor system to configure the first interface to communicate with a third party data source via a common communication interface.

10. An apparatus as defined in claim 9, wherein the stored instructions enable the processor system to provide the first interface with a module resource manager to establish a data context with a resource manager of the common communication interface, and wherein the resource manager associates first properties of the data context with second properties of the common communication interface associated with accessing data in the third party data source.

11. An apparatus as defined in claim 10, wherein the common communication interface includes a plurality of other resource managers, each of which is uniquely associated with a different one of a plurality of other interfaces.

12. A tangible machine accessible medium having instructions stored thereon that, when executed, cause a machine to at least:
    assign a first user-defined parameter name to a first data source operating according to a first access protocol;
    store identifying information in connection with the first user-defined parameter name, the identifying information being indicative of a location at which data from the first data source can be obtained;
    configure a first interface assigned to the first data source to enable a second interface assigned to a second data source to submit to the first interface a data request including the first user-defined parameter name, the data request being of a second access protocol different from the first access protocol, wherein the first and second interfaces are instances of a particular object class, and wherein the second interface is to access the second data source in response to receiving a second data request including a second user-defined parameter name;

in response to the data request of the second access protocol, access the first data source using the first access protocol and the identifying information using the first interface to provide a data value from the first data source to the second interface;

generate a third data request having a third access protocol associated with a third data source, the third data request excluding identifying information defining a location of the third data source; and receive data from the third data source based on the third request.

13. A machine accessible medium as defined in claim 12 having instructions stored thereon that, when executed, cause the machine to cache the data value in the first interface and to transmit the data value cached in the first interface in response to receiving at a later time a fourth data request including the first user-defined parameter name.

14. A machine accessible medium as defined in claim 12 having instructions stored thereon that, when executed, cause the machine to display a tabular graphical user interface having a plurality of user-selectable fields to enable a user to specify the first user-defined parameter name.

15. A machine accessible medium as defined in claim 12 having instructions stored thereon that, when executed, cause the machine to store the first interface in a module data structure that can be communicated to a network entity to be executed by the network entity.

16. A machine accessible medium as defined in claim 12 having instructions stored thereon that, when executed, cause the machine to configure the first interface to access the first data source via a common communication interface.

17. A machine accessible medium as defined in claim 16, wherein the common communication interface is implemented using an object linking and embedding standard.

18. A machine accessible medium as defined in claim 12 having instructions stored thereon that, when executed, cause the machine to enable a data processing function to configure the first interface to perform a mathematical operation on the data value.

19. A machine accessible medium as defined in claim 12 having instructions stored thereon that, when executed, cause the machine to enable an alarm function to configure the first interface to generate an alarm based on the data value.

20. A machine accessible medium as defined in claim 12 having instructions stored thereon that, when executed, cause the machine to configure the first interface to communicate with a third party data source via a common communication interface.

21. A machine accessible medium as defined in claim 20 having instructions stored thereon that, when executed, cause the machine to provide the first interface with a module resource manager to establish a data context with a resource manager of the common communication interface, and wherein the resource manager associates first properties of the data context with second properties of the common communication interface associated with accessing data in the third party data source.

22. A machine accessible medium as defined in claim 21, wherein the common communication interface includes a plurality of other resource managers, each of which is uniquely associated with a different one of a plurality of other interfaces.

23. A method to access information associated with a process control system, the method comprising:

assigning, using a processor, a first user-defined parameter name to a first data source operating according to a first access protocol;

storing identifying information in connection with the first user-defined parameter name, the identifying information being indicative of a location at which data from the first data source can be obtained;

configuring, via the processor, a first interface assigned to the first data source to enable a second interface assigned to a second data source to submit to the first interface a data request including the first user-defined parameter name, the data request being of a second access protocol different from the first access protocol, wherein the first and second interfaces are instances of a particular object class, and wherein the second interface is to access the second data source in response to receiving a second data request including a second user-defined parameter name;

in response to the data request of the second access protocol, accessing the first data source using the first access protocol and the identifying information using the first interface to provide a data value from the first data source to the second interface;

generating a third data request having a third access protocol associated with a third data source, the third data request excluding identifying information defining a location of the third data source; and receiving data from the third data source based on the third request.

24. A method as defined in claim 23, further comprising receiving a second data value updated by the second data source in response to transmitting the second data request including the second user-defined parameter name which is associated with the second data source.

* * * * *